US012810195B2

(12) United States Patent
Nagaraja

(10) Patent No.: US 12,810,195 B2
(45) Date of Patent: Nov. 24, 2026

(54) SYSTEM AND METHOD OF CREATING ARTIFICIAL INTELLIGENCE MODEL, MACHINE LEARNING MODEL OR QUANTUM MODEL GENERATION FRAMEWORK

(71) Applicant: QPIAI INDIA PRIVATE LIMITED, Bangalore (IN)

(72) Inventor: Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 1310 days.

(21) Appl. No.: 17/025,542

(22) Filed: Sep. 18, 2020

(65) Prior Publication Data

US 2021/0334700 A1 Oct. 28, 2021

(30) Foreign Application Priority Data

Apr. 22, 2020 (IN) ............................. 202041017242

(51) Int. Cl.
*G06N 20/00* (2019.01)
*G06F 8/61* (2018.01)
*G06F 16/903* (2019.01)
*G06N 10/60* (2022.01)

(52) U.S. Cl.
CPC ............... *G06N 20/00* (2019.01); *G06F 8/61* (2013.01); *G06F 16/903* (2019.01); *G06N 10/60* (2022.01)

(58) Field of Classification Search
CPC ......... G06F 16/903; G06F 8/61; G06N 10/00; G06N 10/60; G06N 20/00; G06N 3/082
See application file for complete search history.

(56) References Cited

U.S. PATENT DOCUMENTS

| | | | | |
|---|---|---|---|---|
| 11,748,615 | B1 * | 9/2023 | Wu | G06N 3/08 706/25 |
| 2020/0175378 | A1 * | 6/2020 | McDonnell | G06N 3/045 |
| 2020/0302272 | A1 * | 9/2020 | Singh | G06V 10/774 |
| 2021/0224696 | A1 * | 7/2021 | Nasr-Azadani | G06N 5/04 |
| 2021/0287089 | A1 * | 9/2021 | Mayer | G06N 3/04 |

* cited by examiner

*Primary Examiner* — Brent Johnston Hoover
(74) *Attorney, Agent, or Firm* — Foley & Lardner LLP

(57) ABSTRACT

Systems and methods for generating at least one of an automated machine learning (ML) model, artificial intelligence (AI) model or quantum ML model for a user via a model generation framework are provided. The method includes receiving a user input including at least one of a data, one or more tasks and a metadata, from the user, the metadata including least one of: a selection of domain, a selection of sub-domain, or one or more keyword tags. One or more building blocks are determined in the selection of domain or said selection of sub-domain by performing a meta-learning, a transfer learning or a neural architecture search. An optimal model is iteratively determined based on the building blocks and a performance estimation of the building blocks, the optimal model including at least one of AI model, ML model or quantum ML model. The optimal model is rendered to the user.

12 Claims, 20 Drawing Sheets

422

812

814

SYSTEM AND METHOD OF CREATING ARTIFICIAL INTELLIGENCE MODEL, MACHINE LEARNING MODEL OR QUANTUM MODEL GENERATION FRAMEWORK

CROSS-REFERENCE TO RELATED APPLICATION

The present application claims the priority of the Indian Provisional Patent application with serial number 202041017242 filed on Apr. 22, 2020 with the title, "A SYSTEM AND METHOD FOR CREATING AI/ML/QUANTUM AUTOMATED MODEL GENERATION FRAMEWORK", and the contents of which is included entirely as reference herein.

BACKGROUND

Technical Field

The embodiments herein are generally related to a field of network architecture search systems. The embodiments herein are particularly related to a system and a method for creating model generation framework. The embodiments herein are particularly related to a system and a method for automatically creating AI/ML/Quantum Machine learning models from annotated data and partitioning models with respect domains and subdomains.

Description of the Related Art

Neural architecture search (NAS) is a technique for automating the design of artificial neural networks (ANN), a widely used model in the field of machine learning. NAS has been used to design networks that are on par or outperform hand-designed architectures. NAS finds an architecture from all possible architectures by following a search strategy that will maximize the performance and typically includes three dimensions a) a search space, b) a search strategy and c) a performance estimation. The search space is an architecture pattern that is typically designed by an NAS approach. The search strategy is something that depends upon the search methods used to define a NAS approach, for example a Bayesian optimization or a reinforcement learning. The search strategy accounts for the time taken to build a model. The performance estimation is the convergence of certain performance metrics expected out of a NAS produced neural architecture model. In certain cases, it helps in cascading the results to the next iteration for producing a better model and in other cases, it just keeps improvising on its own every time from scratch. Typically, the search space includes huge amount of data and bigger the search space, more computation and time is required to converge on optimal network architecture.

Therefore, to overcome the existing problems and challenges, there remains a need for system and method for generating an artificial intelligence model, a machine learning model or quantum models via a model generation framework that uses a minimized search space compared to existing techniques of NAS.

The abovementioned shortcomings, disadvantages and problems are addressed herein, which will be understood by reading and studying the following specification.

OBJECTIVES OF THE EMBODIMENTS HEREIN

The primary object of the embodiments herein is to develop Capabilities to create domain and sub-domains, within which there is a facility to discover the AI/ML/Quantum models.

Another object of the embodiments herein is to develop a Model generating UI and workspace consisting of a capability to create the domain and sub domain and populate base models to generate optimal AI model Yet another object of the embodiments herein is to develop a UI/workspace consisting of a capability to tag AI/ML/Quantum models according to domain and subdomains Yet another object of the embodiments herein is to develop a UI/workspace consisting of a capability to annotate model using key words, along with domains and sub domains Yet another object of the embodiments herein is to develop a UI/workspace for searching models according to keywords.

Yet another object of the embodiments herein is to develop a UI/workspace for searching tagged models, based on domains, sub-domains and keywords.

Yet another object of the embodiments herein is to develop a UI/workspace for searching tagged and submitted models, based on domains, sub-domains and keywords.

Yet another object of the embodiments herein is to develop a system and a method for an automated meta learning process for new model generation based on the domains, sub domains and keywords.

Yet another object of the embodiments herein is to develop a system and a method for an automated transfer learning for new model generation based on domain, sub domain and keywords Yet another object of the embodiments herein is to develop a system and a method for an Automated Network Architecture Search (NAS) based on information from model annotation of domain, subdomain and keywords.

These and other objects and advantages of the embodiments herein will become readily apparent from the following detailed description taken in conjunction with the accompanying drawings.

SUMMARY

The following details present a simplified summary of the embodiments herein to provide a basic understanding of the several aspects of the embodiments herein. This summary is not an extensive overview of the embodiments herein. It is not intended to identify key/critical elements of the embodiments herein or to delineate the scope of the embodiments herein. Its sole purpose is to present the concepts of the embodiments herein in a simplified form as a prelude to the more detailed description that is presented later.

The other objects and advantages of the embodiments herein will become readily apparent from the following description taken in conjunction with the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The various embodiments herein provide a system and method for creating AI/ML for automatically creating AI/ML/Quantum Machine learning models from annotated data and partitioning models with respect domains and subdomains.

According to an embodiment herein, a system and method are provided for automatically generating AI/ML/Quantum machine learning models from the annotated data.

According to an embodiment herein, a system and method are provided for automatically creating a model generation software framework which supports partitioning of the model generations efforts according to domain and sub domains. Each of these subdomains comprises another levels of subdomains According to an embodiment herein, the domain includes but not limited to healthcare, industrial, transport and finance. For example, the healthcare domain comprises subdomains such as diagnostics, drug discovery and clinical care. Further each of these subdomains comprises another levels of subdomains, for example diagnostics comprises Endoscopy, Ophthalmology and Retinalcare.

The various embodiments herein disclose a number of systems, processor-implemented methods, and non-transitory computer-readable mediums for generating at least one of an automated machine learning model, an artificial intelligence model or a quantum machine learning model by a user via a model generation framework/interface is disclosed.

According to an embodiment herein, a system and method are provided for generating a model from annotated data. The method comprises the following steps: selecting a domain and a subdomain for choosing a platform for operation; selecting an AI/ML base model or generate a new model or fine tune an existing model; uploading data files from local system/user device using a drag and drop feature; retrieving the generated AI/ML model for an online prediction; predicting generated model data using the generated AI/ML model; deploying the generated model data using cloud deployment process or a device specific deployment process; tagging the generated data, wherein the tag is used for tagging generated or imported AI/ML model, and wherein a plurality of custom tags are provided for AI/ML model; submitting the tagged data, and wherein the tagging and submitting are used to submit the model to be used within an enterprise or used as an open source model through a dedicated service provider platform; and data preparation, and wherein the data preparation process involves annotating a raw data, cleansing a raw data and preparing the data for creating AI/ML model framework.

According to an embodiment herein, a system and method are provided for generating a model from annotated data using an AI/ML/Quantum model generation workspace. Using the model generation work space, a user is prompted to select existing Domains or sub domains or create new domains and sub domains. The user is enabled to discover new base model based on combination of tag based meta learning, transfer learning and NAS (Network Architecture search). The workspace is further configured to allow the Retrieval of generated model, prediction using generated model and deployment of the generated model.

According to an embodiment herein, the system and method for generating creating AI/ML/Quantum Machine learning models model for annotating data with respect to domains and subdomains. The method comprises the steps of selecting a domain; selecting a sub domain; choosing a base model based on the selected sub domain in the selected domain; and predicting model data using the generated model for the selected domains and subdomains.

According to an embodiment herein, the process of selecting a domain comprises managing a domain platform operated/used by a user. The domains include a test domain, transport domain, industry domain, health care domain, financial domain etc. according to an embodiment herein, the user is enabled to customize a domain based on requirement. The AI/ML/quantum Automated model generation workspace supports a plurality of mutually different domains According to an embodiment herein, the process of selecting a sub domain for an industry domain comprises managing and selecting one or more subdomains from a group consisting of Industrial IoT, Robotics, Industry, Clean Tech models, etc. Each domain supports a plurality of mutually different sub domains. User is enabled to select both domain and sub domain to work on. The user is allowed to create and add a new subdomain fore a selected domain or customize a sub domain based on need and requirement.

According to an embodiment herein, each sub domain is supported by a model generation system/platform/cockpit. According to an embodiment herein, the process of selecting a model based on the selected sub domain comprises the steps of discovering AI model, and wherein the step of discovering AI model comprises discovering new base model classes; modifying the discovered AI model; generating AI model, and wherein the step of generating AI model comprises generating a new model using a base model; monitoring the selected AI model, and wherein the step of monitoring AI model comprises monitoring functions/activities of the selected model; predicting data using the selected AI model, and wherein the step of predicting data comprises predicting a data through online using the generated/selected AI model; deploying the AI model, and wherein the step of deploying the generated/selected AI model comprises deployment of the AI model through cloud deployment or device specific deployment; and viewing a history of data secured through the deployed AI model, and wherein the step of viewing comprises viewing history/records of data secured through the AI model.

According to one embodiment herein, the method further comprises tagging a data and wherein the step of tagging a data comprises tagging/identifying/assigning a data with a tag, and wherein the tag is used for tagging AI model that is generated/imported, and wherein a plurality of customized tags is provided/defined for tagging an AI model; submitting the tagged model, and wherein the step of tagging and submitting the tagged model comprises submitting the tagged model for use within an enterprise/organisation/users or using the tagged model as an open source through a proprietary service provider platform; and preparing the data, and wherein the step of preparing data comprises annotating a raw data, cleansing the raw data and preparing the data for AI model generation.

According to an embodiment herein, by selecting domain and sub domain, user starts working on automated AI/ML/Quantum model generation, deployment and online prediction. User is also enabled to Tag (Annotate the model) and Tag and Submit (to enterprise repository) a base model or generated model so that a generated and submitted model is searched by other users in the enterprise or community to generate next newer models.

According to one embodiment herein, Model is searched by any other user to select base model using domain, sub domain and key words in a template or user interface.

According to one embodiment herein, new base models are discovered through Meta-learning or Transfer learning or Network architecture search by deducing the domain, sub domain and keyword tags. The search space for Network Architecture Search (NAS) is obtained by proxy search space of all the keywords possible in that space. NAS algorithm searches only possible base model in those space.

According to an embodiment herein, one more layer of search space is introduced based on user tagging of domain, subdomain and Key words.

According to an embodiment herein, a system and method is provided for generating/creating AI/ML/Quantum Machine learning models for annotating data with respect to domains and subdomains. The system creates a search space based on domain, sub domain and keywords using an algorithm. The algorithm is configured to deduce an architecture search space from the generated search space. A historical evolution results in a new search space which helps in reducing computation required for performance evaluation of a model selected from a hierarchical search spaces.

According to an embodiment herein, a system and method is provided for tagging models based on domains, subdomains and key words. The tagged models are used by a user for generating new models.

According to an embodiment herein, a system and method is provided for tagging models based on domains, subdomains and key words, and submitting the tagged models to an enterprise/organisation or community to enable other users in the enterprise/organisation or community for generating new models.

According to an embodiment herein, one or more non-transitory computer readable storage mediums storing one or more sequences of instructions, which when executed by one or more processors, causes a method of generating at least one of an automated machine learning model, an artificial intelligence model or a quantum machine learning model by a user via a model generation framework/interface is disclosed.

According to an embodiment herein, the method includes receiving a user input including at least one of a data, one or more tasks and a metadata, from the user via the model generation framework/interface. The metadata includes at least one of: a selection of domain, a selection of subdomain, or one or more keyword tags. The method also includes determining one or more building blocks in the selection of domain or the selection of sub-domain by performing at least one of: a meta-learning, a transfer learning or a neural architecture search. The method also includes iteratively determining an optimal model based on the one or more building blocks and a performance estimation of the one or more building blocks. The optimal model includes at least one of the automated machine learning model, the artificial intelligence model or the quantum machine learning model. The method also includes rendering the optimal model to the user via the model generation framework/interface.

According to an embodiment herein, the step of determining one or more building blocks includes 1) generating a first search space by querying one or more pre-tagged base models and one or more base models associated with the metadata; 2) deducing a second search space for the neural architecture search from the first search space; 3) building a search strategy based on a meta knowledge from said first search space and an architecture knowledge from the second search space; 4) evaluating a performance of a model associated with the first search space and the second search space based on a historical evaluation result in the first search space and a current evaluation in the second search space; and 5) repeating the steps (3) to step (4) using the performance of the model.

According to an embodiment herein, the method further includes receiving an additional user input including at least one of: a) a type of data, b) a data corresponding to said type of data, c) a target device to perform a data cleansing on, and d) a number of devices and performing a data pre-processing for annotating the user input based on the additional user input for cleansing and encoding the user input into a parsable state.

According to an embodiment herein, the method further includes receiving a training data from the user on the model generation framework/interface, training the optimal model based on the training data, and providing the trained optimal model to the user via the model generation framework/interface.

According to an embodiment herein, the method further includes predicting using the optimal model by receiving a training data from the user via the model generation framework/interface, performing an online prediction of the optimal model by applying one or more model parameters associated with the optimal model to the training data, and rendering a prediction result to the user via the model generation framework/interface.

According to an embodiment herein, the method further includes monitoring the optimal model by receiving an input data from the user in a predetermined format; monitoring the optimal model based on the input data; and rendering a result of the monitoring to the user via the model generation framework/interface. According to an embodiment herein, the monitoring includes a concept drift type monitoring and a covariate shift type monitoring.

According to an embodiment herein, the method further includes generating one or more custom models, including the steps of receiving a unique model name, a data set, and one or more model files from the user on the model generation framework/interface; receiving a dataset and one or more model files from the user; and generating the custom model by using a path of the one or more model files as function parameters. According to an embodiment herein, a selection of the custom model and at least a domain or a sub-domain and one or more keywords to tag the custom model, is received from the user and the custom model is tagged with at least the domain or the sub-domain and the one or more keywords.

According to an embodiment herein, the method further includes deploying the optimal model upon receiving a deployment selection from the user. According to an embodiment herein, deploying the optimal model includes a cloud-based deployment or an edge device specific deployment.

According to an embodiment herein, a system generating at least one of an automated machine learning model, an artificial intelligence model or a quantum machine learning model by a user via a model generation framework/interface is disclosed. The system includes: (a) a memory that stores information associated with the model generation framework/interface, (b) a processor that executes the set of instructions to perform the steps of: a) receiving a user input including at least one of a data, one or more tasks and a metadata, from the user via the model generation framework/interface, metadata including at least one of: a selection of domain, a selection of sub-domain, or one or more keyword tags, c) determining one or more building blocks in the selection of domain or the selection of sub-domain by performing at least one of: a meta-learning, a transfer learning or a neural architecture search; and d) iteratively determining an optimal model based on the one or more building blocks and a performance estimation of the one or more building blocks, wherein the optimal model comprises at least one of the automated machine teaming model, the artificial intelligence model or the quantum machine learning model, and e) rendering the optimal model to the user via the model generation framework/interface.

According to an embodiment herein, the step of determining one or more building blocks includes 1) generating a first search space by querying one or more pre-tagged base models and one or more base models associated with the metadata, 2) deducing a second search space for the neural architecture search from the first search space, 3) building a search strategy based on a meta knowledge from said first search space and an architecture knowledge from the second search space, 4) evaluating a performance of a model associated with the first search space and the second search space based on a historical evaluation result in the first search space and a current evaluation in the second search space, and 5) repeating the steps (3) to step (4) using the performance of the model.

According to an embodiment herein, a processor-implemented method of generating at least one of an automated machine learning model, an artificial intelligence model or a quantum machine learning model by a user via a model generation framework/interface is disclosed.

According to an embodiment herein, the processor-implemented method includes receiving a user input including at least one of a data, one or more tasks and a metadata, from the user via the model generation framework/interface. The metadata includes at least one of: a selection of domain, a selection of sub-domain, or one or more keyword tags. The method also includes determining one or more building blocks in the selection of domain or the selection of sub-domain by performing at least one of: a meta-learning, a transfer learning or a neural architecture search. The method also includes iteratively determining an optimal model based on the one or more building blocks and a performance estimation of the one or more building blocks. The optimal model includes at least one of the automated machine learning model, the artificial intelligence model or the quantum machine learning model. The method also includes rendering the optimal model to the user via the model generation framework/interface.

According to an embodiment herein, the step of determining one or more building blocks includes 1) generating a first search space by querying one or more pre-tagged base models and one or more base models associated with the metadata, 2) deducing a second search space for the neural architecture search from the first search space, 3) building a search strategy based on a meta knowledge from said first search space and an architecture knowledge from the second search space, 4) evaluating a performance of a model associated with the first search space and the second search space based on a historical evaluation result in the first search space and a current evaluation in the second search space, and 5) repeating the steps (3) to step (4) using the performance of the model.

According to an embodiment herein, the processor-implemented method further includes receiving an additional user input including at least one of: a) a type of data, b) a data corresponding to said type of data, c) a target device to perform a data cleansing on, and d) a number of devices and performing a data pre-processing for annotating the user input based on the additional user input for cleansing and encoding the user input into a parsable state.

According to an embodiment herein, the processor-implemented method further includes receiving a training data from the user on the model generation framework/interface, training the optimal model based on the training data, and providing the trained optimal model to the user via the model generation framework/interface.

According to an embodiment herein, the processor-implemented method further includes predicting using the optimal model by receiving a training data from the user via the model generation framework/interface, performing an online prediction of the optimal model by applying one or more model parameters associated with the optimal model to the training data, and rendering a prediction result to the user via the model generation framework/interface.

According to an embodiment herein, the processor-implemented method further includes monitoring the optimal model by receiving an input data from the user in a predetermined format, monitoring the optimal model based on the input data; and rendering a result of the monitoring to the user via the model generation framework/interface. In an embodiment, the monitoring includes a concept drift type monitoring and a covariate shift type monitoring.

According to an embodiment herein, the processor-implemented method further includes generating one or more custom models, including the steps of receiving a unique model name, a data set, and one or more model files from the user on the model generation framework/interface, receiving a dataset and one or more model files from the user; and generating the custom model by using a path of the one or more model files as function parameters. In an embodiment, a selection of the custom model and at least a domain or a sub-domain and one or more keywords to tag the custom model, is received from the user and the custom model is tagged with at least the domain or the sub-domain and the one or more keywords.

According to an embodiment herein, a computer implemented method comprising one or more sequences of instructions stored on a non-transitory computer readable storage medium, and which when executed on a hardware processor on a system, for generating at least one of an automated machine learning model, an artificial intelligence model or a quantum machine learning model by a user via a model generation framework/interface, using a software application or algorithm is disclosed. According to an embodiment herein, the method comprises the steps of receiving a user input including at least one of a data, one or more tasks and a metadata, from the user via the model generation framework/interface. The metadata includes at least one of a selection of domain, a selection of sub-domain, or one or more keyword tags. The method also includes determining one or more building blocks in the selection of domain or the selection of sub-domain by performing a neural architecture search including the steps of: 1) generating a first search space by querying one or more pre-tagged base models and one or more base models associated with the metadata, 2) deducing a second search space for the neural architecture search from the first search space, 3) building a search strategy based on a meta knowledge from said first search space and an architecture knowledge from the second search space, 4) evaluating a performance of a model associated with the first search space and the second search space based on a historical evaluation result in the first search space and a current evaluation in the second search space, and 5) repeating the steps 3) to 4) using the performance of the model. The method also includes iteratively determining an optimal model based on the one or more building blocks and a performance estimation of the one or more building blocks. The optimal model includes at least one of the automated machine learning model, the artificial intelligence model or the quantum machine learning model. The method also includes rendering the optimal model to the user via the model generation framework/interface.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

Figure 1:
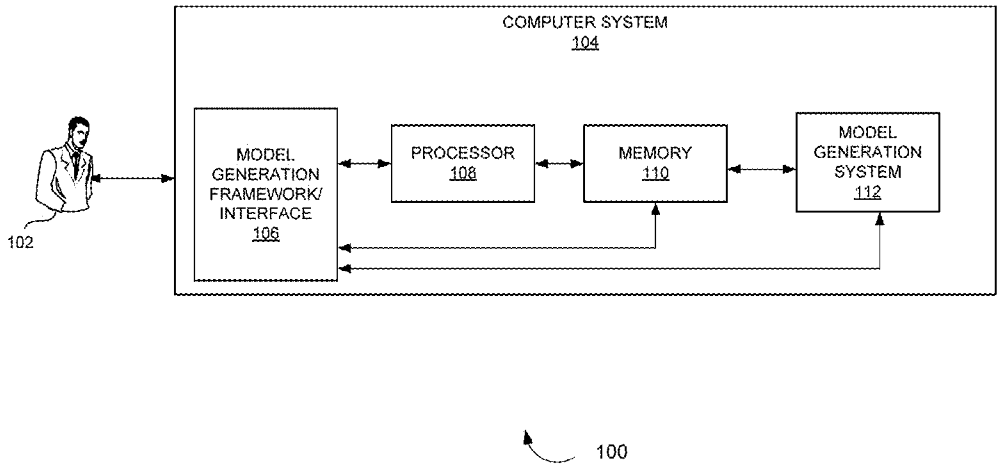
FIG. 1 illustrates a block diagram of a system for a user interacting with a model generation framework/interface using a computer system for generating at least one of an artificial intelligence model, a machine learning model or a quantum model, according to an embodiment herein.

Although the specific features of the embodiments herein are shown in some drawings and not in others. This is done for convenience only as each feature may be combined with any or all of the other features in accordance with the embodiments herein.

DETAILED DESCRIPTION OF PREFERRED EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The various embodiments herein provide a system and method for creating AI/ML for automatically creating AI/ML/Quantum Machine learning models from annotated data and partitioning models with respect domains and subdomains.

According to an embodiment herein, a system and method are provided for automatically generating AI/ML/Quantum machine learning models from the annotated data.

According to an embodiment herein, a system and method are provided for automatically creating a model generation software framework which supports partitioning of the model generations efforts according to domain and sub domains. Each of these subdomains comprises another levels of subdomains According to an embodiment herein, the domain includes but not limited to healthcare, industrial, transport and finance. For example, the healthcare domain comprises subdomains such as diagnostics, drug discovery and clinical care. Further each of these subdomains comprises another levels of subdomains, for example diagnostics comprises Endoscopy, Ophthalmology and Retinalcare.

The various embodiments herein disclose a number of systems, processor-implemented methods, and non-transitory computer-readable mediums for generating at least one of an automated machine learning model, an artificial intelligence model or a quantum machine learning model by a user via a model generation framework/interface is disclosed.

According to an embodiment herein, a system and method are provided for generating a model from annotated data. The method comprises the following steps: selecting a domain and a subdomain for choosing a platform for operation; selecting an AI/ML base model or generate a new model or fine tune an existing model; uploading data files from local system/user device using a drag and drop feature; retrieving the generated AI/ML model for an online prediction; predicting generated model data using the generated AI/ML model; deploying the generated model data using cloud deployment process or a device specific deployment process; tagging the generated data, wherein the tag is used for tagging generated or imported AI/ML model, and wherein a plurality of custom tags are provided for AI/ML model; submitting the tagged data, and wherein the tagging and submitting are used to submit the model to be used within an enterprise or used as an open source model through a dedicated service provider platform; and data preparation, and wherein the data preparation process involves annotating a raw data, cleansing a raw data and preparing the data for creating AI/ML model framework.

According to an embodiment herein, a system and method are provided for generating a model from annotated data using an AI/ML/Quantum model generation workspace. Using the model generation workspace, a user is prompted to select existing Domains or sub domains or create new domains and sub domains. The user is enabled to discover new base model based on combination of tag based meta learning, transfer learning and NAS (Network Architecture search). The workspace is further configured to allow the Retrieval of generated model, prediction using generated model and deployment of the generated model.

According to an embodiment herein, the system and method for generating creating AI/ML/Quantum Machine learning models model for annotating data with respect to domains and subdomains. The method comprises the steps of selecting a domain; selecting a sub domain; choosing a base model based on the selected sub domain in the selected domain; and predicting model data using the generated model for the selected domains and subdomains.

According to an embodiment herein, the process of selecting a domain comprises managing a domain platform operated/used by a user. The domains include a test domain, transport domain, industry domain, health care domain, financial domain etc. according to an embodiment herein, the user is enabled to customize a domain based on requirement. The AI/ML/quantum Automated model generation workspace supports a plurality of mutually different domains According to an embodiment herein, the process of selecting a sub domain for an industry domain comprises managing and selecting one or more subdomains from a group consisting of Industrial IoT, Robotics, Industry, Clean Tech models, etc. Each domain supports a plurality of mutually different sub domains. User is enabled to select both domain and sub domain to work on. The user is allowed to create and add a new subdomain fore a selected domain or customize a sub domain based on need and requirement.

According to an embodiment herein, each sub domain is supported by a model generation system/platform/cockpit. According to an embodiment herein, the process of selecting a model based on the selected sub domain comprises the steps of discovering AI model, and wherein the step of discovering AI model comprises discovering new base model classes; modifying the discovered AI model; generating AI model, and wherein the step of generating AI model comprises generating a new model using a base model; monitoring the selected AI model, and wherein the step of monitoring AI model comprises monitoring functions/activities of the selected model; predicting data using the selected AI model, and wherein the step of predicting data comprises predicting a data through online using the generated/selected AI model; deploying the AI model, and wherein the step of deploying the generated/selected AI model comprises deployment of the AI model through cloud deployment or device specific deployment; and viewing a history of data secured through the deployed AI model, and wherein the step of viewing comprises viewing history/records of data secured through the AI model.

According to one embodiment herein, the method further comprises tagging a data and wherein the step of tagging a data comprises tagging/identifying/assigning a data with a tag, and wherein the tag is used for tagging AI model that is generated/imported, and wherein a plurality of customized tags is provided/defined for tagging an AI model; submitting the tagged model, and wherein the step of tagging and submitting the tagged model comprises submitting the tagged model for use within an enterprise/organisation/users or using the tagged model as an open source through a proprietary service provider platform; and preparing the data, and wherein the step of preparing data comprises annotating a raw data, cleansing the raw data and preparing the data for AI model generation.

According to an embodiment herein, by selecting domain and sub domain, user starts working on automated AI/ML/Quantum model generation, deployment and online prediction. User is also enabled to Tag (Annotate the model) and Tag and Submit (to enterprise repository) a base model or generated model so that a generated and submitted model is searched by other users in the enterprise or community to generate next newer models.

According to one embodiment herein, Model is searched by any other user to select base model using domain, sub domain and key words in a template or user interface.

According to one embodiment herein, new base models are discovered through Meta-learning or Transfer learning or Network architecture search by deducing the domain, sub domain and keyword tags. The search space for Network Architecture Search (NAS) is obtained by proxy search space of all the keywords possible in that space. NAS algorithm searches only possible base model in those space.

According to an embodiment herein, one more layer of search space is introduced based on user tagging of domain, subdomain and Key words.

According to an embodiment herein, a system and method is provided for generating/creating AI/ML/Quantum Machine learning models for annotating data with respect to domains and subdomains. The system creates a search space based on domain, sub domain and keywords using an algorithm. The algorithm is configured to deduce an architecture search space from the generated search space. A historical evolution results in a new search space which helps in reducing computation required for performance evaluation of a model selected from a hierarchical search spaces.

According to an embodiment herein, a system and method is provided for tagging models based on domains, subdomains and key words. The tagged models are used by a user for generating new models.

According to an embodiment herein, a system and method is provided for tagging models based on domains, subdomains and key words, and submitting the tagged models to an enterprise/organisation or community to enable other users in the enterprise/organisation or community for generating new models.

According to an embodiment herein, one or more non-transitory computer readable storage mediums storing one or more sequences of instructions, which when executed by one or more processors, causes a method of generating at least one of an automated machine learning model, an artificial intelligence model or a quantum machine learning model by a user via a model generation framework/interface is disclosed.

According to an embodiment herein, the method includes receiving a user input including at least one of a data, one or more tasks and a metadata, from the user via the model generation framework/interface. The metadata includes at least one of: a selection of domain, a selection of sub-domain, or one or more keyword tags. The method also includes determining one or more building blocks in the selection of domain or the selection of sub-domain by performing at least one of: a meta-learning, a transfer learning or a neural architecture search. The method also includes iteratively determining an optimal model based on the one or more building blocks and a performance estimation of the one or more building blocks. The optimal model includes at least one of the automated machine learning model, the artificial intelligence model or the quantum machine learning model. The method also includes rendering the optimal model to the user via the model generation framework/interface.

According to an embodiment herein, the step of determining one or more building blocks includes 1) generating a first search space by querying one or more pre-tagged base models and one or more base models associated with the metadata; 2) deducing a second search space for the neural architecture search from the first search space; 3) building a search strategy based on a meta knowledge from said first search space and an architecture knowledge from the second search space; 4) evaluating a performance of a model associated with the first search space and the second search space based on a historical evaluation result in the first search space and a current evaluation in the second search space; and 5) repeating the steps (3) to step (4) using the performance of the model.

According to an embodiment herein, the method further includes receiving an additional user input including at least one of: a) a type of data, b) a data corresponding to said type of data, c) a target device to perform a data cleansing on, and d) a number of devices and performing a data pre-processing for annotating the user input based on the additional user input for cleansing and encoding the user input into a parsable state.

According to an embodiment herein, the method further includes receiving a training data from the user on the model generation framework/interface, training the optimal model based on the training data, and providing the trained optimal model to the user via the model generation framework/interface.

According to an embodiment herein, the method further includes predicting using the optimal model by receiving a training data from the user via the model generation framework/interface, performing an online prediction of the optimal model by applying one or more model parameters associated with the optimal model to the training data, and rendering a prediction result to the user via the model generation framework/interface.

According to an embodiment herein, the method further includes monitoring the optimal model by receiving an input data from the user in a predetermined format; monitoring the optimal model based on the input data; and rendering a result of the monitoring to the user via the model generation framework/interface. According to an embodiment herein, the monitoring includes a concept drift type monitoring and a covariate shift type monitoring.

According to an embodiment herein, the method further includes generating one or more custom models, including the steps of receiving a unique model name, a data set, and one or more model files from the user on the model generation framework/interface; receiving a dataset and one or more model files from the user; and generating the custom model by using a path of the one or more model files as function parameters. According to an embodiment herein, a selection of the custom model and at least a domain or a sub-domain and one or more keywords to tag the custom model, is received from the user and the custom model is tagged with at least the domain or the sub-domain and the one or more keywords.

According to an embodiment herein, the method further includes deploying the optimal model upon receiving a deployment selection from the user. According to an embodiment herein, deploying the optimal model includes a cloud-based deployment or an edge device specific deployment.

According to an embodiment herein, a system generating at least one of an automated machine learning model, an artificial intelligence model or a quantum machine learning model by a user via a model generation framework/interface is disclosed. The system includes: (a) a memory that stores information associated with the model generation framework/interface, (b) a processor that executes the set of instructions to perform the steps of: a) receiving a user input including at least one of a data, one or more tasks and a metadata, from the user via the model generation framework/interface, metadata including at least one of: a selection of domain, a selection of sub-domain, or one or more keyword tags, c) determining one or more building blocks in the selection of domain or the selection of sub-domain by performing at least one of: a meta-learning, a transfer learning or a neural architecture search; and d) iteratively determining an optimal model based on the one or more building blocks and a performance estimation of the one or more building blocks, wherein the optimal model comprises at least one of the automated machine learning model, the artificial intelligence model or the quantum machine learning model, and e) rendering the optimal model to the user via the model generation framework/interface.

According to an embodiment herein, the step of determining one or more building blocks includes 1) generating a first search space by querying one or more pre-tagged base models and one or more base models associated with the metadata, 2) deducing a second search space for the neural architecture search from the first search space, 3) building a search strategy based on a meta knowledge from said first search space and an architecture knowledge from the second search space, 4) evaluating a performance of a model associated with the first search space and the second search space based on a historical evaluation result in the first search space and a current evaluation in the second search space, and 5) repeating the steps (3) to step (4) using the performance of the model.

According to an embodiment herein, a processor-implemented method of generating at least one of an automated machine learning model, an artificial intelligence model or a quantum machine learning model by a user via a model generation framework/interface is disclosed.

According to an embodiment herein, the processor-implemented method includes receiving a user input including at least one of a data, one or more tasks and a metadata, from the user via the model generation framework/interface. The metadata includes at least one of: a selection of domain, a selection of sub-domain, or one or more keyword tags. The method also includes determining one or more building blocks in the selection of domain or the selection of sub-domain by performing at least one of: a meta-learning, a transfer learning or a neural architecture search. The method also includes iteratively determining an optimal model based on the one or more building blocks and a performance estimation of the one or more building blocks. The optimal model includes at least one of the automated machine learning model, the artificial intelligence model or the quantum machine learning model. The method also includes rendering the optimal model to the user via the model generation framework/interface.

According to an embodiment herein, the step of determining one or more building blocks includes 1) generating a first search space by querying one or more pre-tagged base models and one or more base models associated with the metadata, 2) deducing a second search space for the neural architecture search from the first search space, 3) building a search strategy based on a meta knowledge from said first search space and an architecture knowledge from the second search space, 4) evaluating a performance of a model associated with the first search space and the second search space based on a historical evaluation result in the first search space and a current evaluation in the second search space, and 5) repeating the steps (3) to step (4) using the performance of the model.

According to an embodiment herein, the processor-implemented method further includes receiving an additional user input including at least one of: a) a type of data, b) a data corresponding to said type of data, c) a target device to perform a data cleansing on, and d) a number of devices and performing a data pre-processing for annotating the user input based on the additional user input for cleansing and encoding the user input into a parsable state.

According to an embodiment herein, the processor-implemented method further includes receiving a training data from the user on the model generation framework/interface, training the optimal model based on the training data, and providing the trained optimal model to the user via the model generation framework/interface.

According to an embodiment herein, the processor-implemented method further includes predicting using the optimal model by receiving a training data from the user via the model generation framework/interface, performing an online prediction of the optimal model by applying one or more model parameters associated with the optimal model to the training data, and rendering a prediction result to the user via the model generation framework/interface.

According to an embodiment herein, the processor-implemented method further includes monitoring the optimal model by receiving an input data from the user in a predetermined format, monitoring the optimal model based on the input data; and rendering a result of the monitoring to the user via the model generation framework/interface. In an embodiment, the monitoring includes a concept drift type monitoring and a covariate shift type monitoring.

According to an embodiment herein, the processor-implemented method further includes generating one or more custom models, including the steps of receiving a unique model name, a data set, and one or more model files from the user on the model generation framework/interface, receiving a dataset and one or more model files from the user; and generating the custom model by using a path of the one or more model files as function parameters. In an embodiment, a selection of the custom model and at least a domain or a sub-domain and one or more keywords to tag the custom model, is received from the user and the custom model is tagged with at least the domain or the sub-domain and the one or more keywords.

According to an embodiment herein, a computer implemented method comprising one or more sequences of instructions stored on a non-transitory computer readable storage medium, and which when executed on a hardware processor on a system, for generating at least one of an automated machine learning model, an artificial intelligence model or a quantum machine learning model by a user via a model generation framework/interface, using a software application or algorithm is disclosed. According to an embodiment herein, the method comprises the steps of receiving a user input including at least one of a data, one or more tasks and a metadata, from the user via the model generation framework/interface. The metadata includes at least one of: a selection of domain, a selection of sub-domain, or one or more keyword tags. The method also includes determining one or more building blocks in the selection of domain or the selection of sub-domain by performing a neural architecture search including the steps of: 1) generating a first search space by querying one or more pre-tagged base models and one or more base models associated with the metadata, 2) deducing a second search space for the neural architecture search from the first search space, 3) building a search strategy based on a meta knowledge from said first search space and an architecture knowledge from the second search space, 4) evaluating a performance of a model associated with the first search space and the second search space based on a historical evaluation result in the first search space and a current evaluation in the second search space, and 5) repeating the steps 3) to 4) using the performance of the model. The method also includes iteratively determining an optimal model based on the one or more building blocks and a performance estimation of the one or more building blocks. The optimal model includes at least one of the automated machine learning model, the artificial intelligence model or the quantum machine learning model. The method also includes rendering the optimal model to the user via the model generation framework/interface.

The various embodiments disclosed herein provide a processor-implemented method and system for generating automated machine learning models, artificial intelligence models or quantum models. Referring now to the drawings, and more particularly to FIGS. 1 through 9, where similar reference characters denote corresponding features consistently throughout the figures, preferred embodiments are shown.

FIG. 1 is a system view illustrating a user 102 interacting with a model generation framework/interface 102 using a computer system 104 for generating at least one of an artificial intelligence model, a machine learning model or a quantum model, according to an embodiment herein. Various systems and processor-implemented methods disclosed herein enable generating at least one of an artificial intelligence model, a machine learning model or a quantum model, via a model generation system 112 based on inputs from the user 102 received through the model generation framework/interface 106 associated with the model generation system 112. The computer system 104 further includes a memory 110 that stores a database and a set of instructions, and a processor 108 that is configured by the set of instructions to execute the model generation system 112 and the model generation framework/interface 106. The database stores information associated with the model generation system 112 and the model generation framework/interface 106. The model generation system 112 generates at least one of an artificial intelligence model, a machine learning model or a quantum model (referred to hereinafter as model) based on an input data from the user 102 received through the model generation framework/interface 106. Examples of the model includes, but is not limited to Linear Regression, Logistic Regression, Deep Feed Forward Network, Extreme Learning Machine (ELM), Canadian Institute For Advanced Research (CIFAR) ResNet, CIFAR ResNext, CIFAR Wider ResNet, DenseNet, Deep Layer Aggregation (DLA), GoogleNet, Inception Network, MobileNet, MobileNet_v3, Pruned ResNet, Residual Attentionet, Squeeze and Excitation Network (SENet), SqueezeNet, XCeption Network, Efficient Network, Residual Network (ResNet), AlexNet, and the like.

According to an embodiment herein, the model generation system 112 is for example, an application installed on a user device and the model generation framework/interface 106 is for example, a user interface provided by the model generation system 112 on the user device. Examples of the user device includes, but is not limited to a mobile computing device, a laptop, a desktop, a tablet personal computer, and the like. The model generation system 112 of the present technology allows the user to select/create one or more domains to sub-domains and generate at least one of the artificial intelligence model, the machine teaming model or the quantum model (referred to herein after as the model) based on the domains or the sub-domains by discovering one or more new base models based on a combination of tag generated based at least one of a meta learning, a transfer learning and a network architecture search (NAS). The model generation system 112 also enables the user 102 to retrieve the generated model and deploy the generated model via the model generation framework/interface 106.

According to an embodiment herein, the model generation system 112 receives a user input including at least one of a data, one or more tasks and a metadata, from the user 102 via the model generation framework 106. The data includes, for example, but is not limited to an image data, a video data, an audio data, a text data, a tabular data, and the like. The metadata includes at least one of: a selection of domain, a selection of sub-domain, or one or more keyword tags. Examples of the domain include but are not limited to, healthcare, industrial, transport and finance. Examples of the sub-domain include, but are not limited to, healthcare domain subdomains can be diagnostics, drug discovery, clinical care, and the like. Each of these sub-domains may contain another levels of sub-domains, for example diagnostics can contain endoscopy, ophthalmology and retinal care. According to an embodiment herein, the model generation system 112 prepares the data for annotating raw data, cleansing raw data and preparing data for usage in a model generation process.

According to an embodiment herein, the model generation system 112, receives an additional user input including at least one of: a) a type of data, b) a data corresponding to the type of data, c) a target device to perform a data cleansing on, and d) a number of devices and performs a data preprocessing for annotating the user input based on the additional user input for cleansing and encoding the user input into a parsable state. The data preparation (or preprocessing) can include, for example, edge detection, corner detection, enhancement, blur, grayscale conversion, background subtraction, and the like for an image data or video data, a wave form trim, denoise, a fast-fourier transform, a short-fourier transform, a beats count, and the like for an audio data, noise removal, tokenization normalization (stemming & lemmatization), and the like for a text data, binarizer, label binarizer, multi-label binarizer, standard scaler, min-max scaler, max-abs scaler, robust scaler, label encoder, one-hot encoder, ordinal encoder, custom function transformer, polynomial features, power transformer, and the like for a tabular data. The one or more tasks includes, for example, generate model, predict model, deploy model, monitor model, view history, discover model, and the like.

According to an embodiment herein, the model generation system 112 determines one or more building blocks in the selection of domain or the selection of sub-domain by performing at least one of: a meta-learning, a transfer learning or a neural architecture search. As used herein the term "meta-learning" refers to a subfield of machine learning where automatic learning algorithms are applied to metadata about machine learning experiments. As used herein the term "transfer learning" refers to a process in machine learning (ML) that focuses on storing knowledge gained while solving one problem and applying it to a different but related problem. For example, knowledge gained while learning to recognize cars could apply when trying to recognize trucks. As used herein the term "neural architecture search" refers to a technique for automating the design of artificial neural networks (ANN), a widely used model in the field of machine learning. NAS has been used to design networks that are on par or outperform hand-designed architectures.

According to an embodiment herein, in order to determine one or more building blocks, the model generation system 112 performs the steps including 1) generates a first search space by querying one or more pre-tagged base models and one or more base models associated with the metadata, 2) deduces a second search space for said network architecture search from said first search space, 3) builds a search strategy based on a meta knowledge from said first search space and an architecture knowledge from said second search space, and 4) evaluates a performance of a model associated with said first and second search spaces based on a historical evaluation results in said first search space and a current evaluation in said second search space. The performance evaluation is taken as feedback to building the search strategy and the steps 3) and 4) are repeated iteratively. In an embodiment, the performance evaluation is based on a target performance provided by the user 102 via the model generation framework/interface 106 and the performance nearest to the target performance is chosen. The process is described in detail further along with FIGS. Since the first search space and the second search space are built only based on the metadata and key words, the present technology dramatically reduces the search space and the renders the search to be more effective compared to conventional model generation techniques.

According to an embodiment herein, the model generation system 112 builds the search strategy by taking each base model through an architecture search. One or more base models are selected in the first search space and the second search space based on the search strategy and the selected base models are tested on the input data provided by the user. Based on the test, one or more base models are filtered out, for example, top ten base models are filtered out. The model generation system 112 performs, for example, a neural architecture search on the filtered base models and extracts a cell space of each filtered base model from a network definition of different layers contained in the base models. The cell spaces are used with commands such as, "Replicate a layer", "Add new layer", "Delete layer", "Add drop out", and "Create a branch" to alter the network structure. In an embodiment, the model generation system 112 uses several reinforcement learning techniques to evaluate effect of operation on network performance after each of above processes involved in determining one or more building blocks. In an embodiment, each base model can have parallel runs of its commands and validation. In an embodiment, natural language processing (NLP) based techniques are used to match nearest keywords during the search.

The model generation system 112 iteratively determines an optimal model based on the one or more building blocks and a performance estimation of the building blocks, wherein said optimal model comprises one of said automated machine learning model, said artificial intelligence model or said quantum machine learning model. The model generation system 112 renders the optimal model to the user 102 via the model generation framework 106.

According to an embodiment herein, the model generation system 112 receives a training data from the user on the model generation framework/interface. In an embodiment, the training data includes a) a unique identifier identifying name of a model, b) a training data set for training said model, c) a type of file selection comprising at last an image, a text, a video, and a tabular structure, d) a name of column in a dataset for tabular file type; and e) a custom model file, from said user via said model generation framework/interface, f) a base model with which the user 102 intends to train on the training data, g) a target device on which the user 102 intends to train the model, h) a number of a processing unit (e.g., central processing unit/graphics processing unit) the user 102 intends to use, i) a particular performance parameter from the drop down list, j) a numeric value which will be the target the model will try to achieve in terms of the selected performance parameter, k) a maximum number of days and hours the user intends the model to run before giving the best results, and l) a click on generate model wait for the model to train. The model generation system 112 trains the optimal model based on the training data; and provides the trained optimal model to the user 102 via the model generation framework/interface.

According to an embodiment herein, the model generation system 112 performs an online prediction using the optimal model. In an embodiment, in order to predict, the model generation system 112 receives a training data from the user via the model generation framework/interface. The model generation system 112 performs an online prediction of the optimal model by applying one or more model parameters associated with the optimal model to the training data. The model generation system 112 renders a prediction result to the user via the model generation framework/interface.

According to an embodiment herein, the model generation system 112 monitors the optimal model. In order to monitor the optimal model, the model generation system 112 receives an input data from the user in a predetermined format. According to an embodiment herein, the model generation system 112 monitors the optimal model based on the input data; and renders a result of the monitoring to the user via the model generation framework/interface. According to an embodiment herein, the monitoring includes at least a concept drift type monitoring and a covariate shift type monitoring. According to an embodiment herein, the model generation system 112 generates one or more custom models. The model generation system 112 receives a unique model name, a data set, and one or more model files from the user on the model generation framework/interface. The model generation system 112 receives a dataset and one or more model files from the user 102 and generates the custom model by using a path of the one or more model files as function parameters.

According to an embodiment herein, the model generation system 112 receives a selection of the custom model and at least a domain or a sub-domain and one or more keywords to tag the custom model, from the user 102 and tags the custom model with the at least a domain or a sub-domain and one or more keywords. In an embodiment, the model generation system 112 deploys the optimal model upon receiving a deployment selection from the user 102. According to an embodiment herein, deploying the optimal model may include a cloud-based deployment or an edge device specific deployment. Please note that the term "optimal model" and "model" have been used interchangeably throughput the detailed description.

Figure 2:
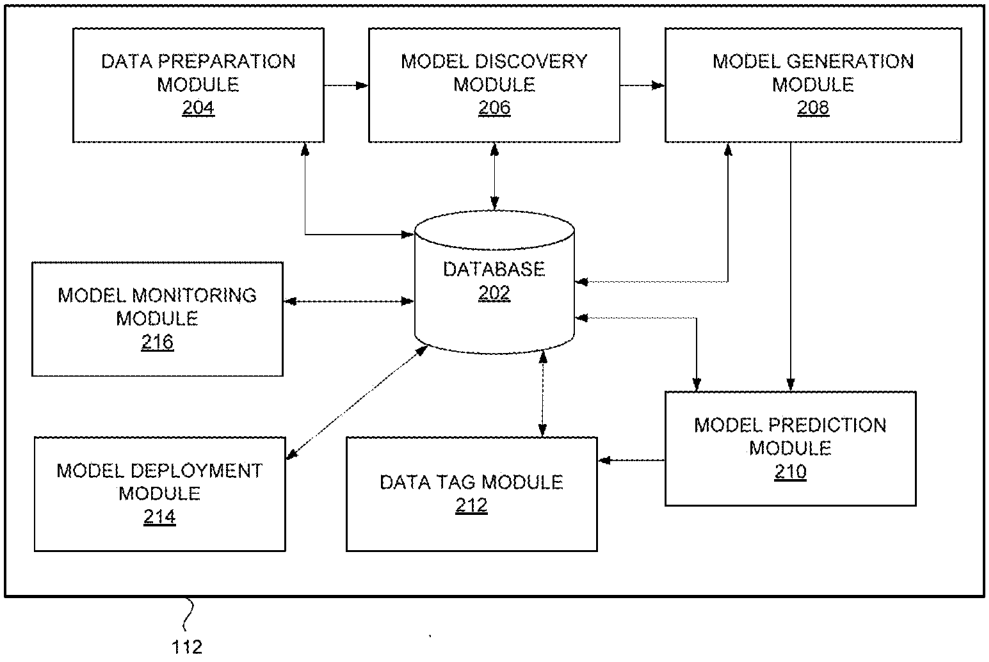
FIG. 2 illustrates a functional block diagram of a model generation system of FIG. 1, according to an embodiment herein.

FIG. 2 illustrates an exploded view of the model generation system 112 of FIG. 1, according to an embodiment herein. The model generation system 112 includes a database 202, a data preparation module 204, a model discovery module 206, a model generation module 208, a model prediction module 210, a data tag module 212, and a model deployment module 214, and a model monitoring module 216.

According to an embodiment herein, the data preparation module 204 receives the user input including the data, the one or more tasks, and the metadata provided by the user 102 via the model generation framework/interface 106 and performs a data preprocessing for annotating the user input (raw data) and cleaning and preparing data associated with the user input to be used to generating the model (AI/ML/Quantum model). The data preprocessing involves transforming or encoding the user input to a parsable state. The data preprocessing can include, for example, edge detection, corner detection, enhancement, blur, grayscale conversion, background subtraction, and the like for an image data or video data, a wave form trim, denoise, a Fast-Fourier transform, a short-Fourier transform, a beats count, and the like for an audio data, noise removal, tokenization normalization (stemming & lemmatization), and the like for a text data, binarizer, label binarizer, multi-label binarizer, standard scaler, min-max scaler, max-abs scaler, robust scaler, label encoder, one-hot encoder, ordinal encoder, custom function transformer, polynomial features, power transformer, and the like for a tabular data.

According to an embodiment herein, the model discovery module 206 discovers newer base models class based on an annotated data obtained based on data preprocessing. In an embodiment, the model generation module 208 iteratively determines an optimal model based on the building blocks and a performance estimation of the building blocks. According to an embodiment herein the model prediction module 210, performs model predictions on a data provided by user 102. The data may include, for example an image, a text, a video, a tabular data, and the like. Once the user 102 uploads the data or file to run prediction on, the model prediction module 210 predicts the model based on the uploaded data and provides predictions to the user 102 via the model generation framework/interface 106. According to an embodiment herein the user 102 also provides a link generated during a model training (described below) instead of uploading a large parameter file which may take a significant time to upload and the model prediction module 210 performs the prediction based on data available on the link.

According to an embodiment herein, the data tag module 212, enables the user 102 to tag any base model to a domain or a sub-domain so as to enable searching of the base models (by the user 102) related to any particular domain or sub-domain in the models generated by the model generation system 112. According to an embodiment herein, the model deployment module 214 enables the user to deploy the generated AI/ML/Quantum model (referred to herein after as "the generated model") into an existing production environment. The model deployment module 214 enables the user to deploy the generated model on a cloud or on an edge device. The model deployment module 214 transforms the model for deployment and performs device specific optimization and containerization (for cloud-based deployment) or integration with specific toolkits (for edge device-based deployment).

According to an embodiment herein, the model monitoring module 216 monitors one or more functions of the generated model based on a request from the user 102. According to an embodiment herein, model monitoring module 216 performs a) a concept drift type monitoring and b) a covariate shift type monitoring. The concept drift type monitoring identifies a change in relationship between one or more features and a model target and requires a model retrain as it causes drop in a model performance. An implementations of concept drift type monitoring includes for example, evaluation of classification accuracy metrics for future timelines. The covariate shift type monitoring identifies a drift in the distribution of features of the generated model and also indicates a strong sample selection bias and helps in proactively selecting features of the model. An implementation of the covariate shift type monitoring includes computation of distance metrics based on a Kolmogorov-Smimov test or an auto-encoder reconstruction error for the generated models.

Figure 3:
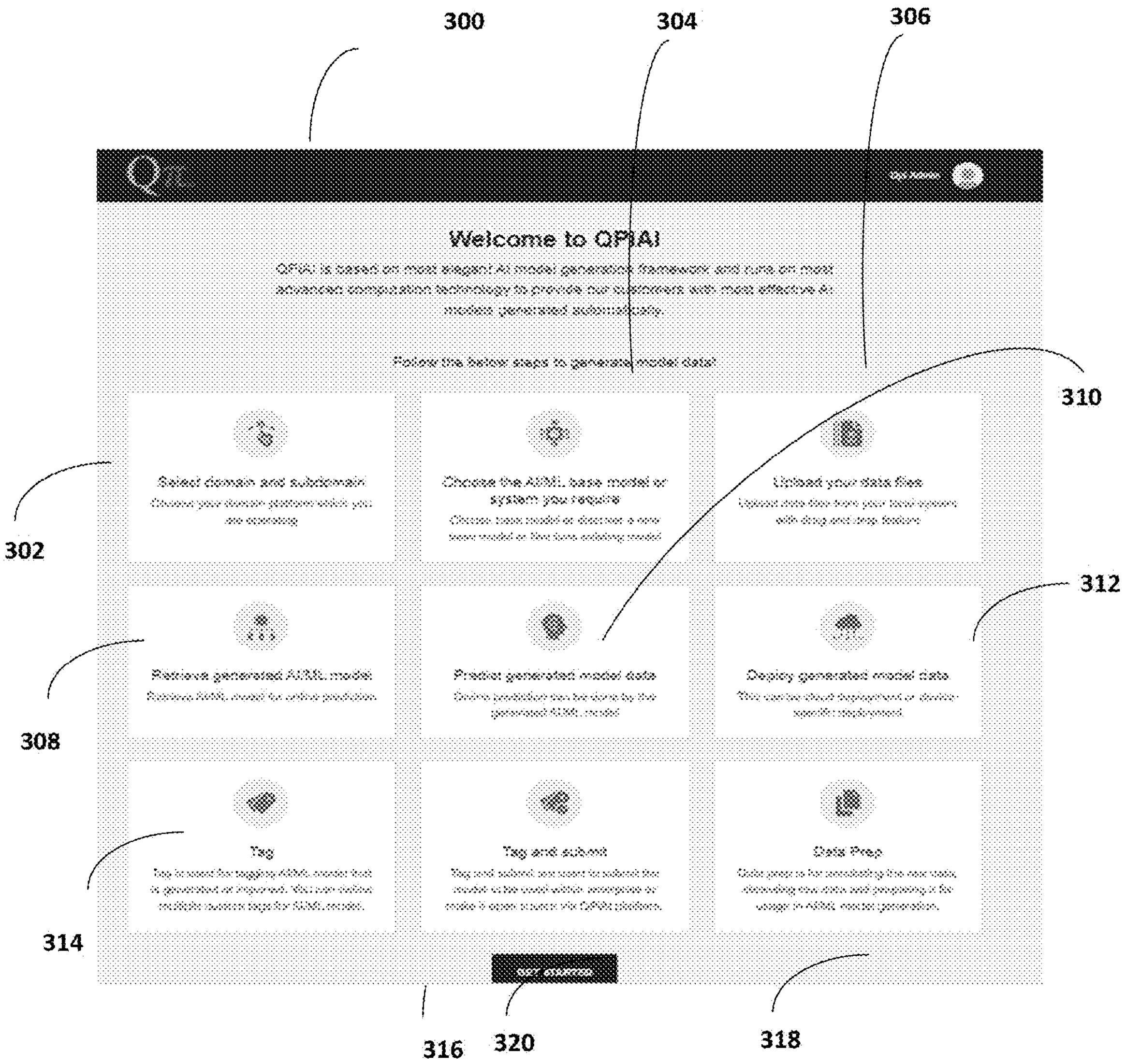
FIG. 3 illustrates an exemplary user interface view of the model generation framework on a user device, in accordance with an embodiment herein.

FIG. 3 shows an exemplary user interface view of the model generation framework/interface 106 on a user device, in accordance with an embodiment herein. According to an embodiment herein, the user 302 installs an executable file corresponding to the model generation system 112 of the present technology on a user device and on completion of installation, the user 102 is prompted to login with details provided to the user 102. Upon login, the user interface view 300 as depicted in FIG. 3 is displayed on the user device. The user interface view 300 includes various tabs such as "Select domain and subdomain" tab 302, "Choose the AI/ML base model or system you require" tab 304, "Upload your data files" tab 306, "Retrieve generated AI/ML model" tab 308, "Predict generated model data" tab 310, "Deploy generated model data" tab 312, "Tag" tab 314, "Tag and submit" tab 316, "Data Prep" tab 318, and "GET STARTED" tab corresponding to various tasks that are performed by the user via the model generation framework 106. The user 102 is prompted to select one of the tasks by selecting one of the tabs 302-318 and subsequently select the "GET STARTED" tab 320 to begin the process associated with the task.

The "select domain and subdomain" tab 302 allows the user 102 to select either the domain or sub-domain via for example, a drop-down menu or also allows the user to create a new domain or sub-domain unavailable in the drop-down menu. The "choose the AI/ML base model or system you require" tab 304 allows the user 102 to choose a base model or discover a new base model or fine tune an existing model. The "Upload your data files" tab 306 allows the user 102 to upload data files from the user device with a drag and drop feature. The "Retrieve generated AI/ML model" tab 308 allows the user 102 to retrieve a generated model for online prediction. The "Predict generated model data" tab 310 allows the user 302 to predict the generated model functions online. The "Deploy generated model data" tab 312 allows the user 302 to deploy the generated model either via cloud or a device specific deployment. The "Tag" tab 314 allows the user 302 to tag the generated model or an imported model and also allows defining multiple custom tags for the generated or imported models. The "Tag and submit" tab 316 allows the user 302 to submit the generated model to be used within enterprise or make the generated model an open source mode. The "Data Prep" tab 318 allows the user 102 to annotate the raw data associated with user input provided by the user 102 for cleaning and preparing the raw data for usage in generation of the model.

Figure 4A:
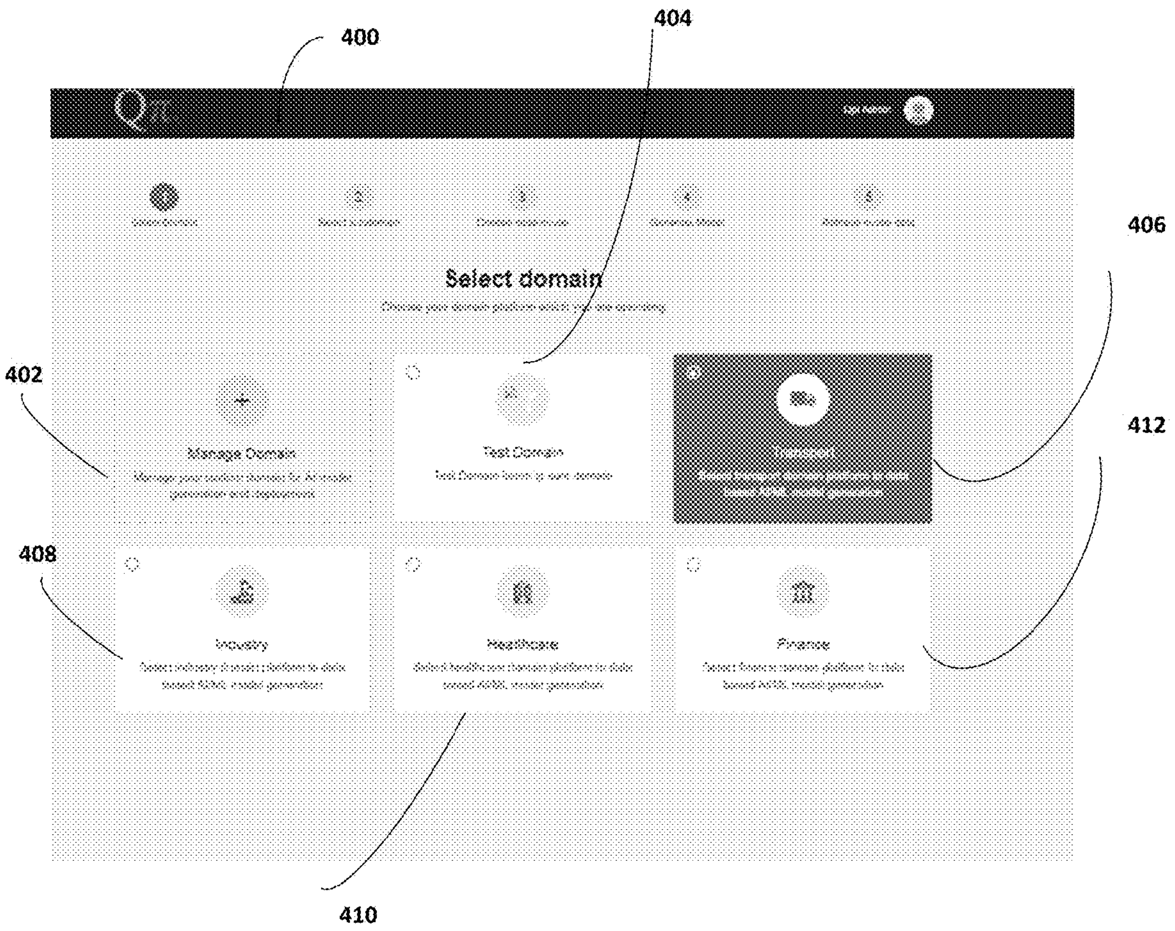
FIGS. 4A-4C illustrate user interface views for selection of domain or sub-domain by the user in the model generation framework/interface, in accordance with an embodiment herein.
Figure 4B:
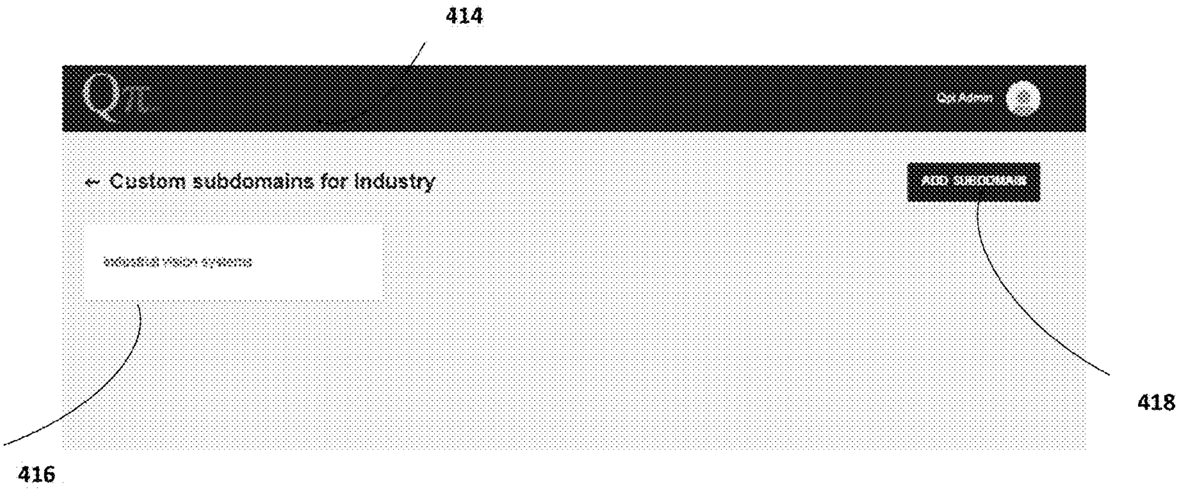
Figure 4C:
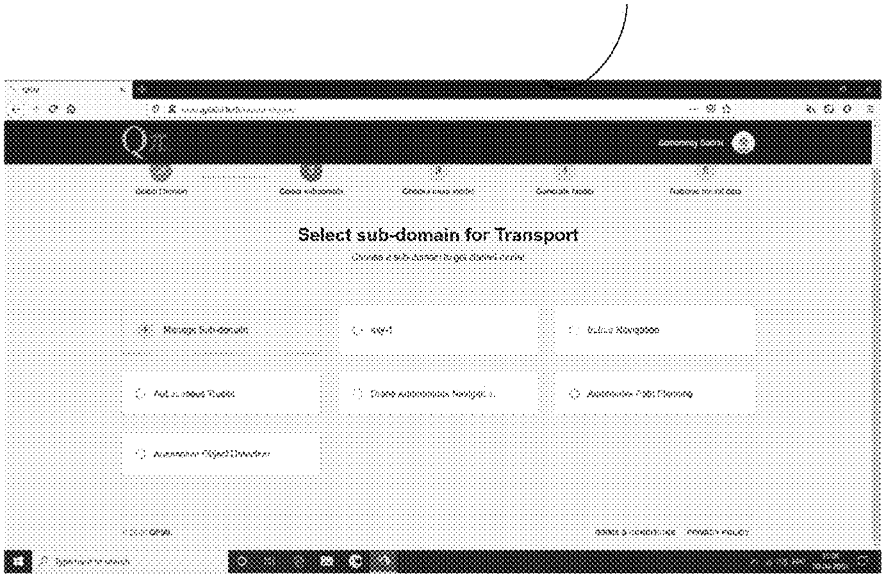

FIGS. 4A-4C shows user interface views for selection of domain or sub-domain by the user 302 in the model generation framework/interface 106, in accordance with an embodiment. As shown in FIG. 4A, upon selection of the "select domain and subdomain" tab 302 of the user interface view 300 of FIG. 3, the user 102 is displayed the user interface view 400 of FIG. 4A. The user interface view 400 includes a "Manage Domain" tab 402, a "Test Domain" tab 404, a "Transport" tab 406, a "Industry" tab 408, a "Healthcare" tab 410 and a "Finance" tab 412. The "Manage Domain" tab 402 allows the user 102 create a custom domain for generating the model. The "Test Domain" tab 404 allows the user 102 to select from an existing list of domains such as "Transport" 406, "Industry" 408, "Healthcare" 410, and "Finance" 412.

FIG. 4B shows a user interface view 414 for selection of a sub-domain by the user 102 in the model generation framework/interface 106, in accordance with an embodiment. The user interface view 414 includes a "industrial vision systems" tab 416 and "ADD SUBDOMAIN" tab 418. The "industrial vision systems" represents a custom sub-domain for the domain "Industry" 408. The user 102 is enabled to either select the sub-domain industrial vision systems or add a new sub-domain by selecting the "ADD SUBDOMAIN" tab 418.

FIG. 4C shows another user interface view 422 for selection of a sub-domain by the user 102 in the model generation framework/interface 106, in accordance with an embodiment herein. On selection of the "Transport" 406 domain in the user interface view 400, the user 102 is displayed the user interface view 422 of FIG. 4C. The user interface view 422 includes "Manage Sub-domain" tab 424, "axy-1" tab 426, "Indoor Navigation" tab 428, "Autonomous Trucks" tab 430, "Drone Autonomous Navigation" tab 432, "Automotive Path Planning" tab 434, and "Automotive Object Detection" tab 436. The Indoor Navigation" tab 428, "Autonomous Trucks" tab 430, "Drone Autonomous Navigation" tab 432, "Automotive Path Planning" tab 434, and "Automotive Object Detection" tab 436 correspond to sub-domains associated with the domain "Transport" 406. The user 102 is enabled to select from sub-domains, by choosing an appropriate tab. Subsequent to domain/sub-domain selection the model generation framework/interface 106 prompts the user 102 to upload data.

Figure 5A:
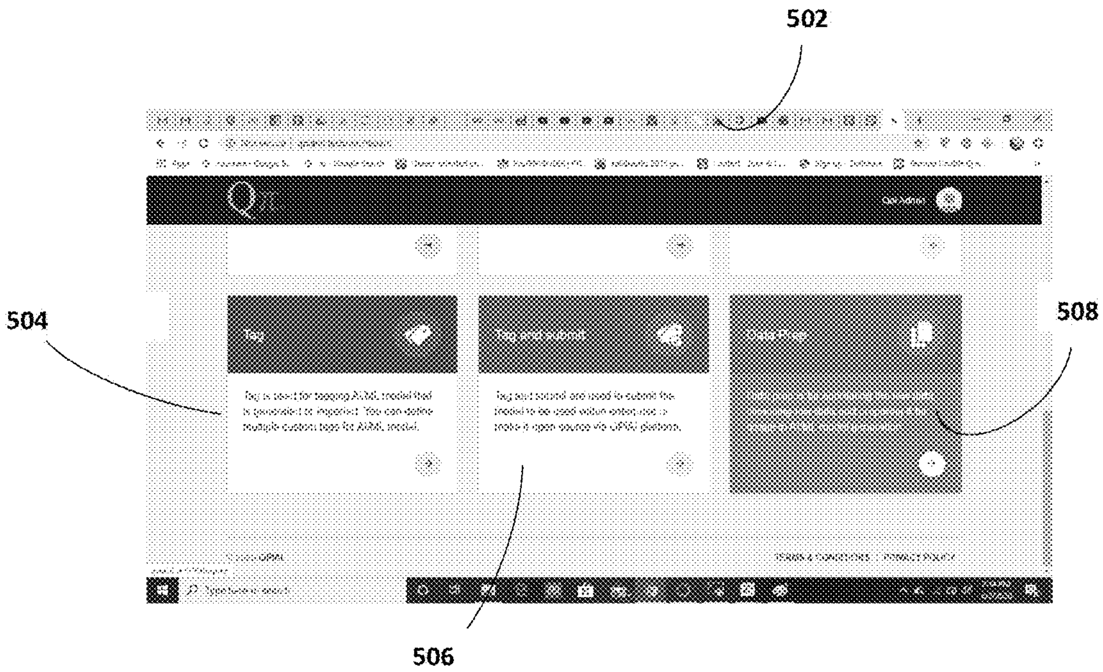
FIG. 5A-5E illustrate a user interface view for data preparation by the user in the model generation framework/interface, in accordance with an embodiment herein.
Figure 5B:
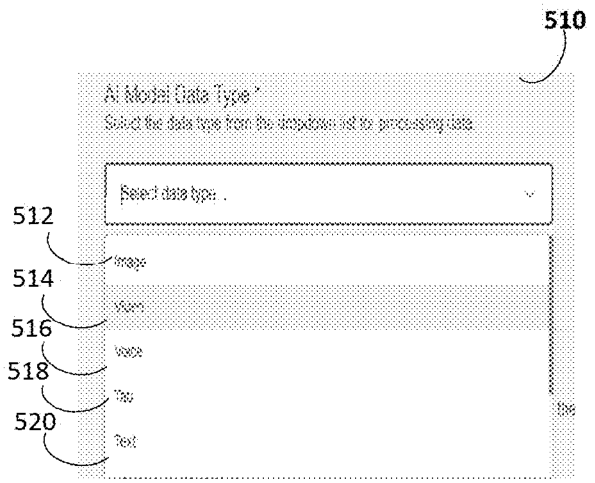

FIG. 5A-5E shows a user interface view for data preparation by the user 102 in the model generation framework/interface 106, in accordance with an embodiment herein. The user interface view 502 include "Tag" tab 504, "Tag and submit" tab 506, and "Data Prep" tab 508. According to an embodiment herein, on selection of the "Data Prep" tab 508 by the user 102, a user interface view 510 of FIG. 5B is displayed to the user 102. As depicted in FIG. 5B, the user 102 is displayed various options for selection of data type such as, image 512, video 514, voice 516, tab 518, and text 520. According to an embodiment herein, after choosing the data type, the user 102 is enabled to upload/browse the file according to the selected data type. According to an embodiment herein, the user 102 is enabled to also choose a target column in the tabular dataset on which the "dataprep" command is applied. For example, the user is allowed to type the column number in the target column and then select the "dataprep" command (such as for example, Minmax scaling) so that the respective column is being transformed accordingly.

Figure 5C:
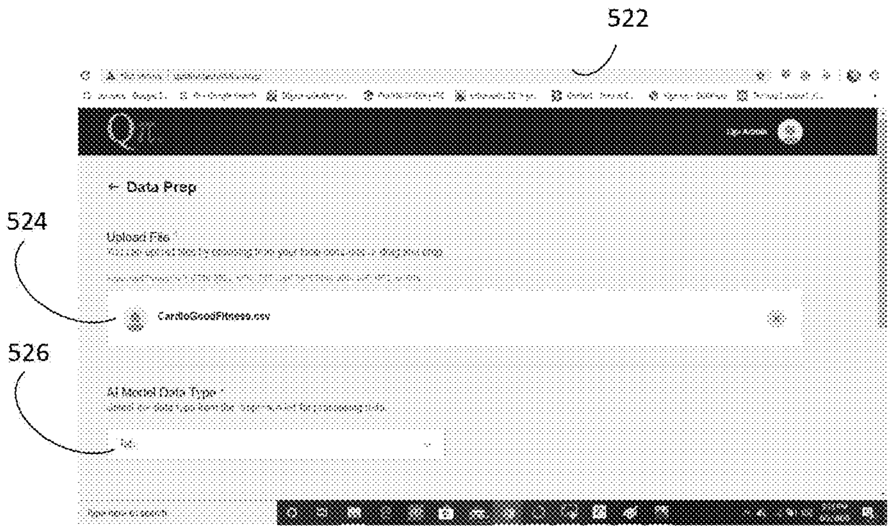
Figure 5D:
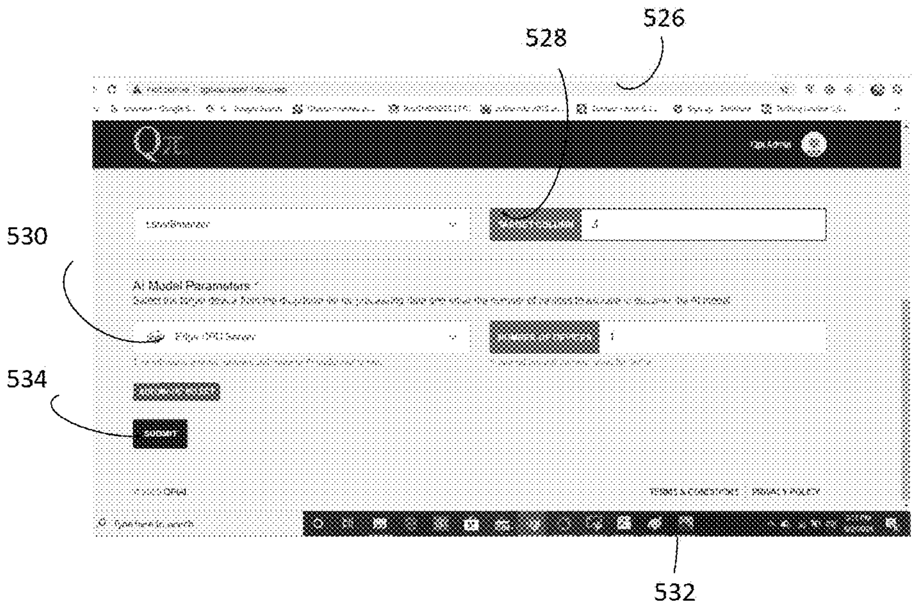
Figure 5E:
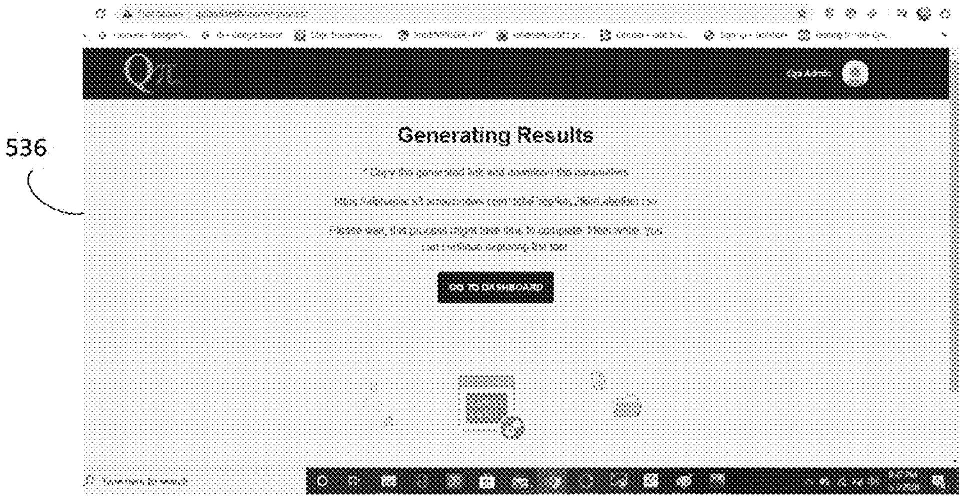

The user interface view 522 of FIG. 5C includes a "Upload File" tab 524 and a "AI model Data Type" tab 526. The user uploads data file at the "Upload File" tab 524 and selects the data type at the "AI Model Data Type" tab 526. According to an embodiment herein, the user 102 selects a type of "dataprep" command from the dropdown menu to choose a type of data cleaning to be applied on the data uploaded. For example, upon the user 102 uploading a video/image data, then the "dataprep" commands would be Edge Detection/Corner Detection, and the like. Upon selection of data type, the user 102 is displayed with a user interface view 526 as shown in FIG. 5D. The user interface view 526 includes a "TARGET COLUMN" tab 528, "AI Model Parameters" tab 530, "NUMBER OF DEVICES" tab 532, and "SUBMIT" tab 534. According to an embodiment herein, the user 102 selects a device on which the data cleaning process is to be performed, such as for example, an edge central processing unit (CPU) server. The user 102 also enters a number of CPU to use in the "NUMBER OF DEVICES" tab 532, (for example 1 as shown in FIG. 5D). Subsequently, the user 102 selects the "SUBMIT" tab 534, and a user interface view 536 of FIG. 5E is displayed to the user. The user 102 is provided with a downloadable link for the cleaned data that can be stored or used by the user 102 at a later instance for model generation.

FIG. 6A-6D shows a user interface view for generating the model by the user 102 in the model generation framework/interface 106, in accordance with an embodiment herein. Subsequent to data preparation, the user 102 is displayed with a user interface view 602 of FIG. 6A that includes a "Discover AI Model" tab 604, a "Generate AI Model" tab 606, a "Monitor AI Model" tab 608, a "Predict using AI model" tab 610, a "Deploy AI Model" tab 612, and a "View History" tab 614. The user 102 selects the "Generate AI Model" tab 606 and a user interface view 616 of FIG. 6B for uploading data files is displayed to the user 102. The user interface view 616 includes a "Model Name" tab 618, a "Uploaded Data Set" tab 620, and a "Model tags" tab 622. The user 102 is prompted to type a unique identifier in the "Model Name" tab 618, for example, mobilenet. The user 102 uploads a training dataset by, for example, providing a downloadable link for the dataset and a link to the uploaded data is shown in the "Uploaded Data Set" tab 620.

The training dataset includes the previously cleaned and prepared data by the user 102. The user 102 is provided with a drop-down list to select a file type, such as for example, image, image, text, video, tabular and the like. The user 102 also is enabled to enter a target column in case of tabular data. The user 102 uploads a custom model file by for example, providing a downloadable link else a pre-existing base model is used. The user 102 selects a base model to train the dataset with and a target device on which the model is to be trained. Upon selection of the base model, the user is provided with a user interface view 624 as depicted in FIG. 6C. The user interface view 624 includes a "AI Model Parameters" tab 626, a "Performance Parameters" tab 628, a "Time Limit" tab 630, and a "GENERATE MODEL" tab 631. Further, the user 102 is also enabled to select model parameters through the "AI Model Parameters" tab 626, a "number of devices to use for training the model, a particular performance parameter from the drop down list of the Performance Parameters" tab 628, a numeric value (for example, 50) which the target the model will try to achieve in terms of your selected performance parameter, a maximum number of days and hours that the model needs to run before giving the best results using the Time Limit" tab 630. The user 102 then clicks on the "GENERATE MODEL" tab 631. On clicking the "GENERATE MODEL" tab 631, a user interface 632 of FIG. 6D is displayed to the user 102. The user interface 632 includes a "Download AI model" tab 634 and a "GO TO DASHBOARD" tab 636. The user 102 can click on the "GENERATE MODEL" tab 631 and wait for the model to train. Alternatively, the user 102 is enabled to click on the GO TO DASHBOARD" tab 636 to go to his/her dashboard.

Figure 6A:
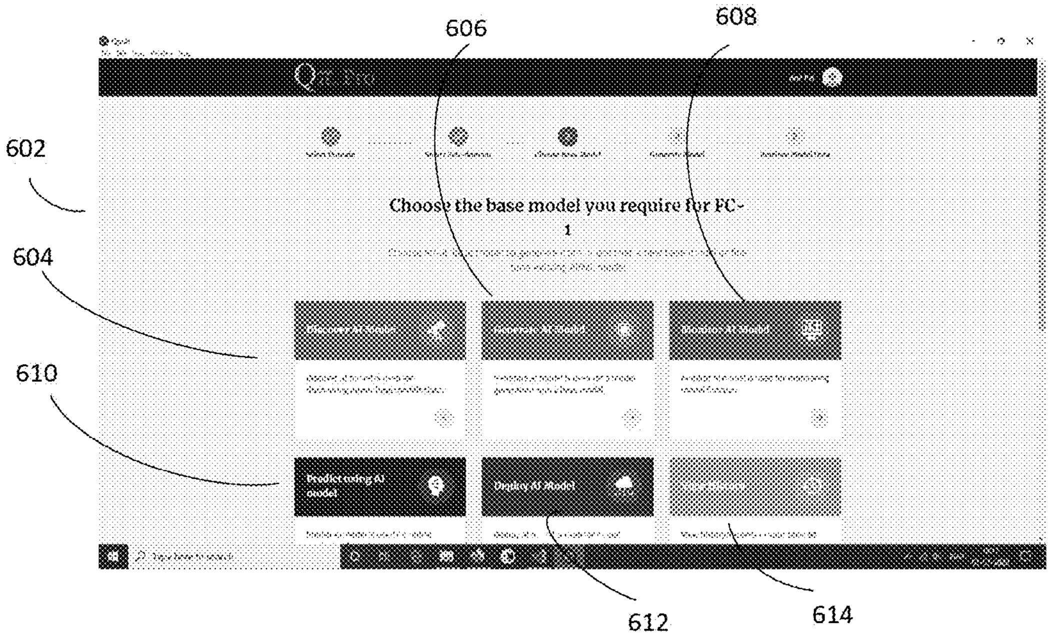
FIG. 6A-6D illustrate a user interface view for generating the model by the user in the model generation framework/interface, in accordance with an embodiment herein.
Figure 6B:
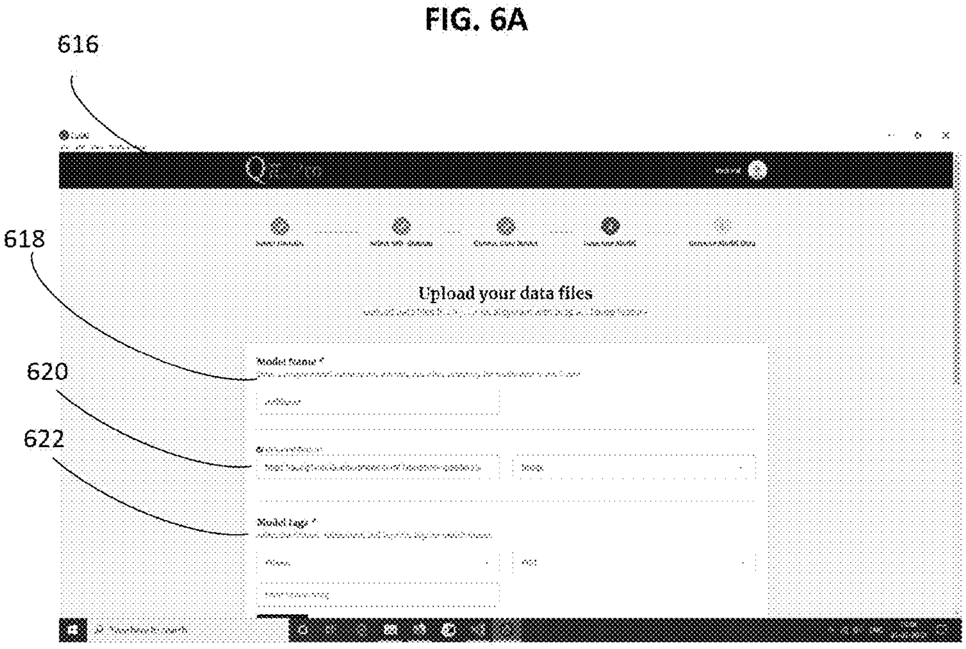
Figure 6C:
Figure 6D:
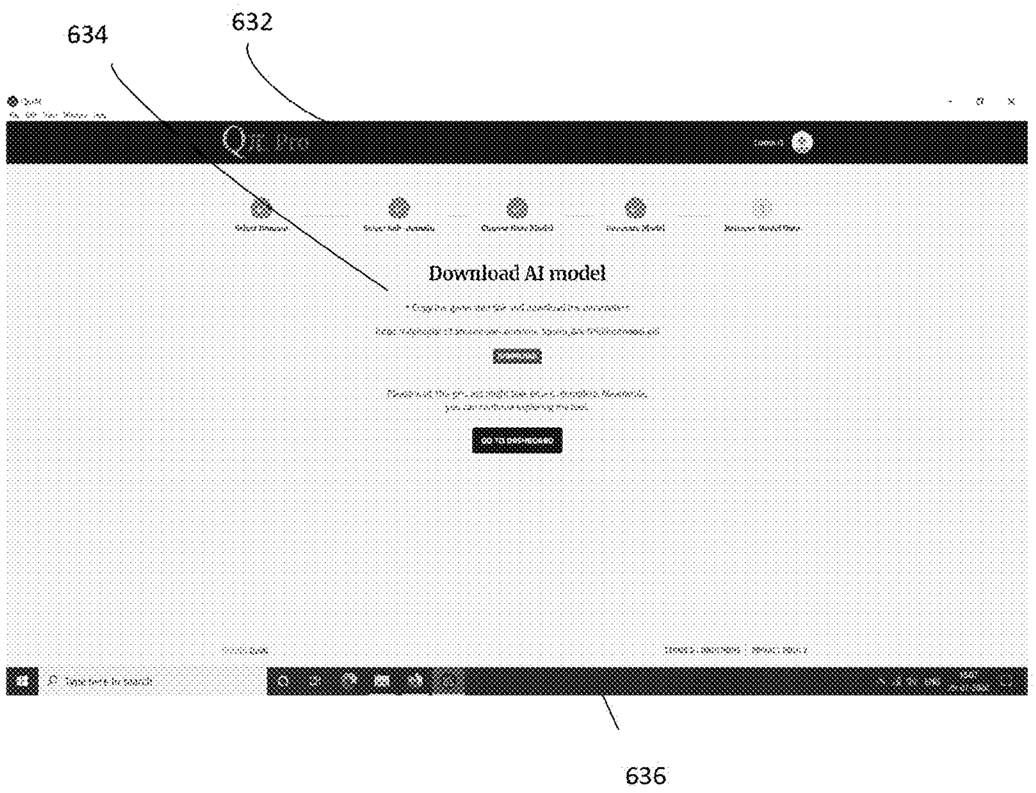
Figure 7:
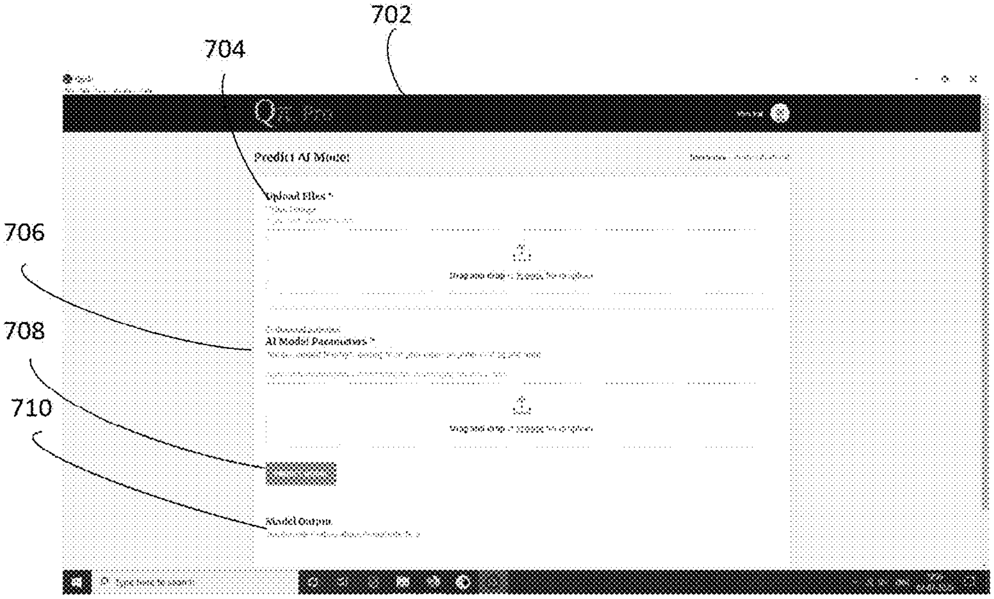
FIG. 7 illustrates a user interface views for predicting the model by the user in the model generation framework/interface, in accordance with an embodiment herein.

According to an embodiment herein, upon the user 102 selecting the "Predict using AI model" tab 610 on the user interface view 602 of FIG. 6A, a user interface view 702 of FIG. 7 is displayed to the user 102.

FIG. 7 is a user interface views for predicting the model by the user 102 in the model generation framework/interface 106, in accordance with an embodiment herein. The user interface view 702 includes "Upload Files" tab 704, "AI Model Parameters" tab 706, "PREDICT MODEL" tab 708, and "Model Output" tab 710. The user is allowed to select a type of data i.e. image, text, video, tabular, and the like and upload the file that the user needs to run the predictions on in the "Upload Files" tab 704. Subsequently the user 102 is enabled to upload the model parameters previously downloaded in the "AI Model Parameters" tab 706. The user 102 is also enabled to provide the link generated during training instead of uploading the large parameter file that may take a significant time to upload. The user 102 is enabled to subsequently click on "PREDICT MODEL" tab 708 to generate an online prediction of the model and the process may take a few seconds. The user 102 may view the prediction by clicking on the Model Output" tab 710. The user 102 may download the results of the prediction.

Figure 8A:
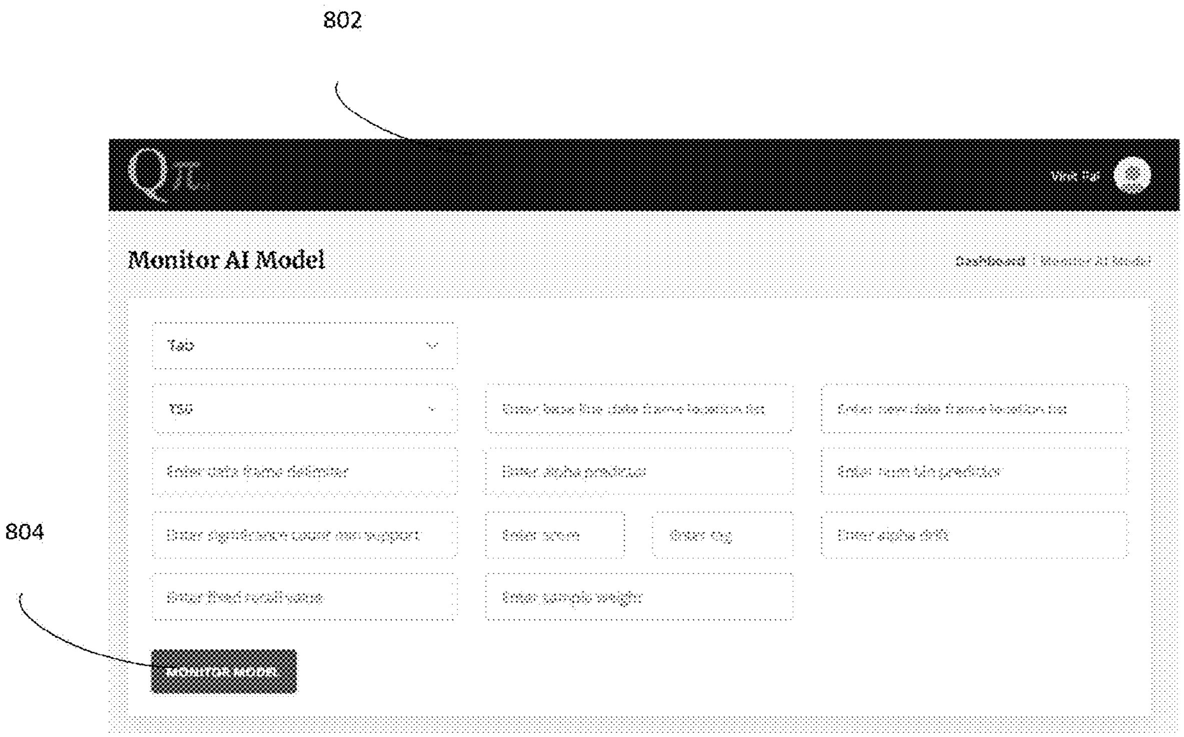
FIG. 8A-8D illustrate a user interface view for monitoring the model by the user in the model generation framework/interface, in accordance with an embodiment herein.
Figure 8B:
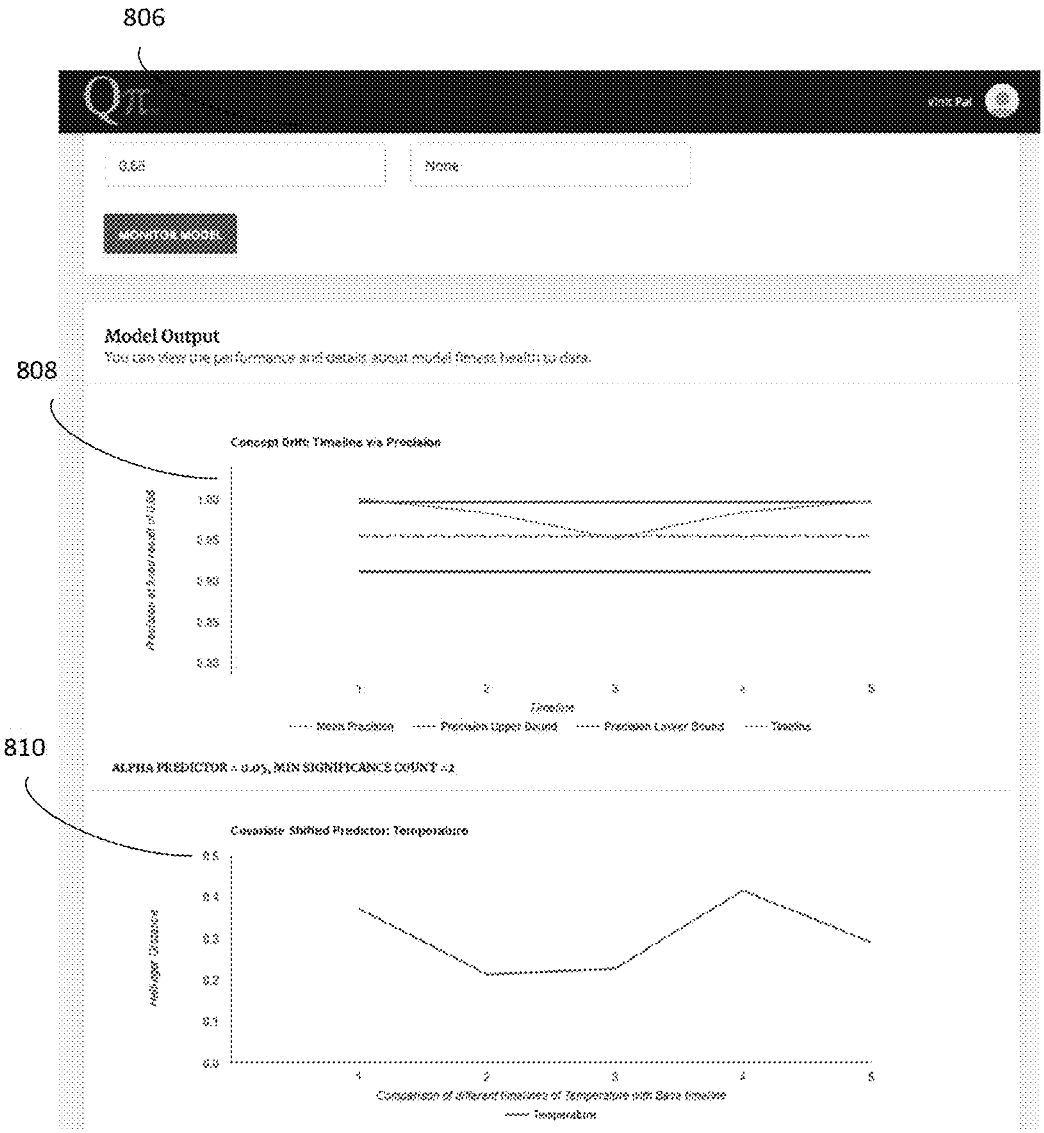

FIG. 8A-8D shows a user interface view for monitoring the model by the user 102 in the model generation framework/interface 106, in accordance with an embodiment herein. According to an embodiment herein, on selecting the "Monitor AI Model" tab 608, a user interface view 802 of FIG. 8A is displayed to the user 102. The user interface view 802 includes a "MONITOR MODEL" tab 804. The user 102 provides various inputs such as for example, a baseline Data Frame Location including for example, an S3 bucket uniform resource locator (URL) location of baseline csv datasets on which the model was tested, including the model target, prediction score of model, all features used in the model, b) a new data frame locations including for example, a comma separated s3 bucket URL location of csv datasets of future timelines i.e. the future dataset on which the model is to be monitored for batch use case including the model target, prediction score of model, all features used in the model, c) a data frame delimiter including, for example, a delimiter of dataset, d) an alpha predictor including, for example, the significance level of Kolmogorov-Smimov test to test the hypothesis if any predictor in the future timeline comes from the same distribution as the baseline distribution of the predictor (typically set at 0.05), e) number of bins for predictor including for example, a number of equal frequency bins to divide a predictor, to compute Hellinger distance metric for covariate shift type monitoring f) significance count minimum support including for example, the minimum number of times should a predictor fail KS test for it to be considered a drifted feature, g) a name of score column, h) a name of target column, i) an alpha drift including for example, a significance level to decide the confidence interval i.e. upper and lower bound of classification metric value (typically set at 0.05 for 95% confidence interval or at 0.01 for 99% confidence interval), j) a fixed recall value at which precision will be computed for classification accuracy, k) a sample weight including name of sample weight column if present, set it to 'none'. An exemplary response of monitoring the generated model based on a tabular data is displayed as a user interface view 806 of FIG. 8B. In an embodiment, a batch model monitoring is performed in a concept drift type monitoring or a covariate shift type monitoring (explained earlier along with FIG. 2). FIG. 8B shows a first exemplary output 808 corresponding to a concept drift type monitoring and a second exemplary output 810 corresponding to a covariate shift type monitoring.

Figure 8C:
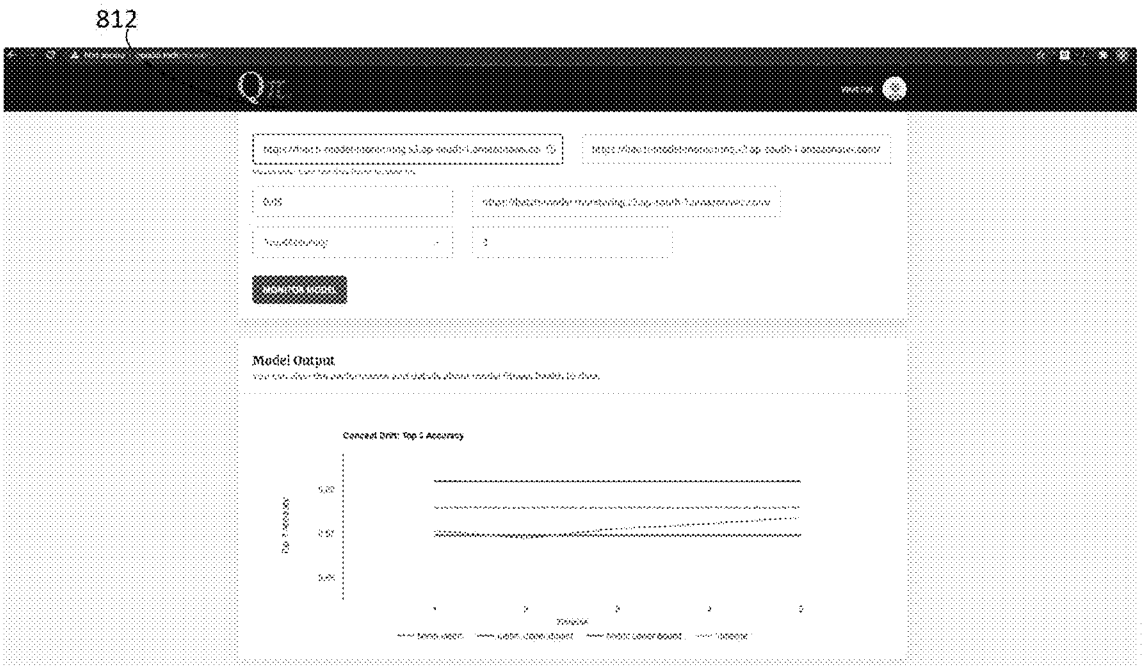
Figure 8D:
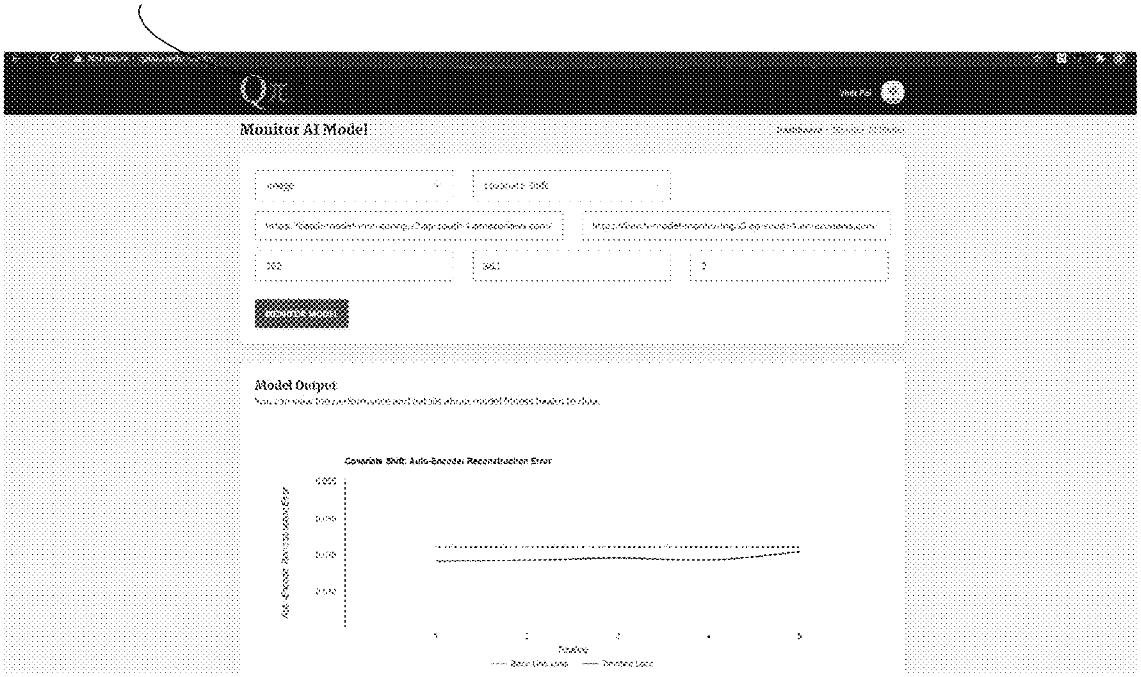

An exemplary scenario of batch model monitoring for an image data is depicted in FIGS. 8C-8D, in accordance with an embodiment herein. According to an embodiment herein, for running a model monitoring of image data, the data set format required includes a train/test/future timeline dataset in zip file format such that when the .zip file is extracted, it is a folder with the name 'data_<dataset type>' like for timeline 1 dataset, it is the 'data_1'. Inside the 'data_<dataset type>' folder there are subfolders with the name of the classes for that particular dataset and inside each such subfolder, it contains all the images of that particular class.

FIG. 8C shows a user interface view 812 of an exemplary batch monitoring output for an image data performed based on a concept drift type monitoring, in accordance with an embodiment herein. According to an embodiment herein, for concept drift type monitoring, the user 102 selects 'Concept Drift' in the Monitor type and fill up the input fields as follows:

a. Enter Test Data Location: S3 bucket location of test dataset.
b. Enter Future Timeline Data Locations: S3 bucket locations of future timeline datasets.
c. Enter Alpha Drift: Significance level to decide the confidence interval i.e. upper and lower bound of classification metric value. Typically set at 0.05 for 95% confidence interval or at 0.01 for 99% confidence interval.
d. Enter Model File Location: S3 bucket location of model pickle file.
e. Select Evaluation Metric: Select between metrics like Cross Entropy loss, Accuracy and Top 'k' Accuracy.

FIG. 8D shows a user interface view 814 of an exemplary batch monitoring output for an image data performed based on a covariate shifted monitoring, in accordance with an embodiment herein. According to an embodiment herein, for covariate shift type monitoring, the user 102 selects 'Covariate Shift' in the Monitor type and fills up the input fields as follows:

a. Enter Baseline Data Location: S3 bucket location of baseline dataset.
b. Enter Future Timeline Data Locations: S3 bucket locations of future timeline datasets.
c. Enter Image Pixel Length: Image pixel length.
d. Enter Image Pixel Width: Image pixel width.
e. Enter Image Layers: Image pixel layers, most likely 3.
f. Enter Encoder Hidden Dimensions: Comma separated number of neurons in each layer of encoder part of the network. For example, entering value of '512,256,128, 64' constructs a network of seven hidden layers with numbers of neurons in each layer being: 512, 256, 128, 64, 128, 256, 512.

Figure 9A:
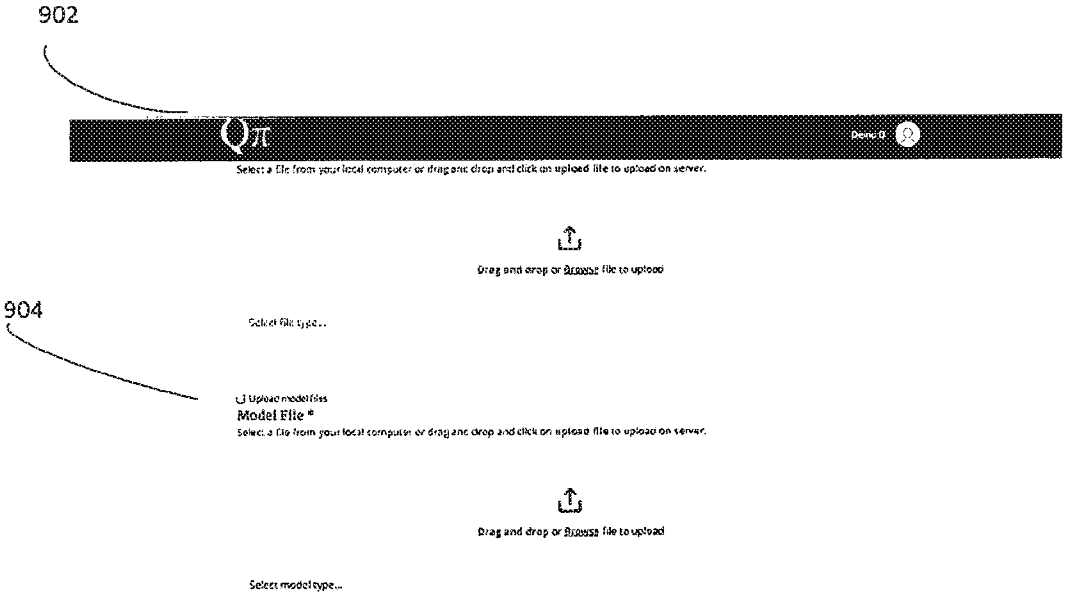
FIGS. 9A-9C illustrate user interface views for creating and running custom models by the user via the model generation framework/interface, in accordance with an embodiment herein.
Figure 9B:
Figure 9C:
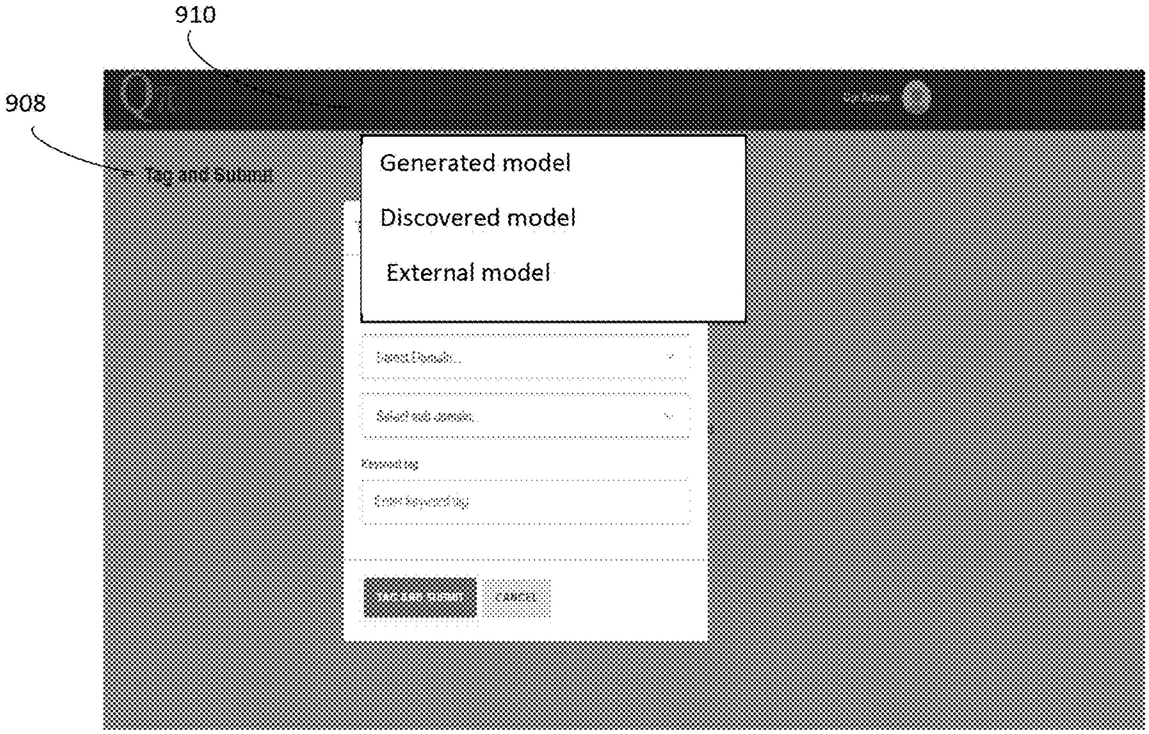

FIGS. 9A-9C show user interface views for creating and running custom models by a user 102 via the model generation framework/interface 106, in accordance with an embodiment. A user interface view 902 of FIG. 9A includes a "Model File" tab 904. The user 102 either selects a file type from a drop-down menu or drag and drop files to upload a model file. According to an embodiment herein, a custom model is pushed into organisation repository on submission of the model file by the user 102 and the model name is added to the database of an organisation and included in a base model list. Upon submission of the model file, the user 102 is displayed a user interface view 906 of FIG. 9B. The user interface view 906 of FIG. 9B includes a "Tag and Submit" tab 908. The user 102 is allowed to tag/annotate the model file with a domain name, a sub-domain name, a keyword using the "Tag and Submit" tab 908 as shown in user interface view 910 of FIG. 9C. The user 102 tags any custom/base model to a given domain and subdomain and in the generated model users will be able to search base models related to any domain and sub-domain.

Figure 10A:
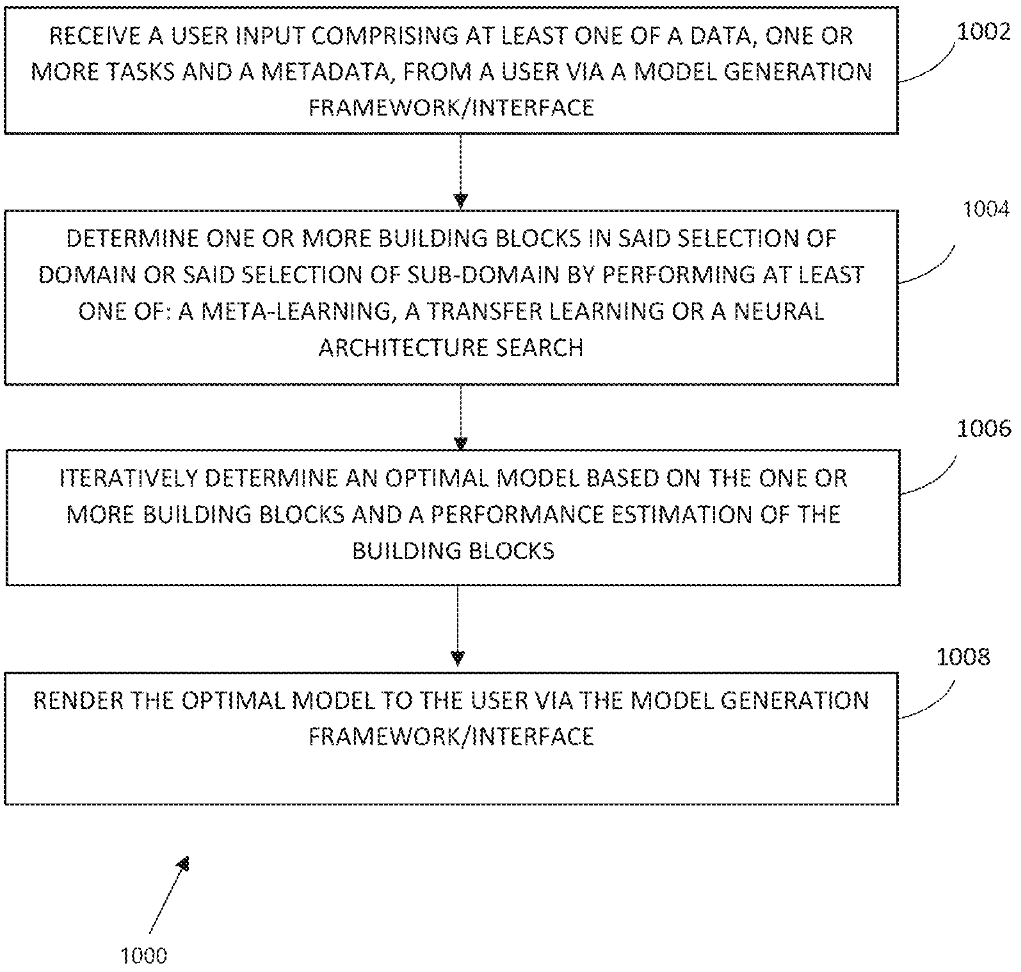
FIG. 10A illustrates a flow chart explaining a processor-implemented method of generating at least one of an automated machine learning model, an artificial intelligence model or a quantum machine learning model by a user via a model generation framework/interface, in accordance with an embodiment herein.

FIG. 10A shows a flow diagram 1000 that illustrates a processor-implemented method of generating at least one of an automated machine learning model, an artificial intelligence model or a quantum machine learning model by a user via a model generation framework/interface, in accordance with an embodiment herein. At step 1002, the method includes receiving a user input including at least one of a data, one or more tasks and a metadata, from the user via the model generation framework/interface, the metadata includes at least one of: a selection of domain, a selection of sub-domain, or one or more keyword tags. At step 1004, the method includes determining one or more building blocks in the selection of domain or the selection of sub-domain by performing at least one of a meta-learning, a transfer learning or a neural architecture search. At step 1006, the method includes iteratively determining an optimal model based on the one or more building blocks and a performance estimation of the one or more building blocks. The optimal model includes at least one of the automated machine learning model, the artificial intelligence model or the quantum machine learning model. At step 1006, the method includes rendering the optimal model to the user via the model generation framework/interface.

Figure 10B:
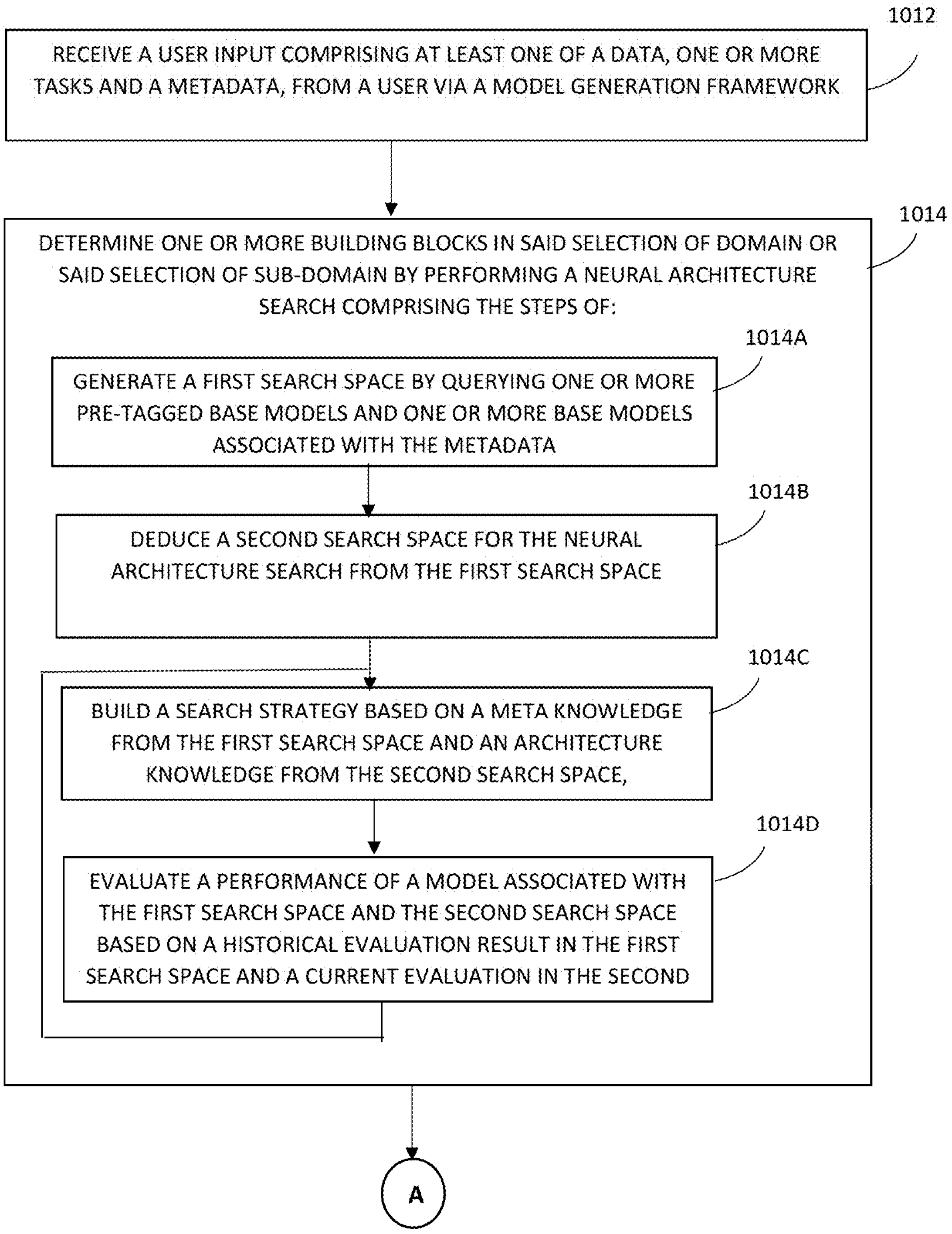
FIGS. 10B-10C illustrates a flow chart explain a processor-implemented method of generating an automated machine learning model, an artificial intelligence model or a quantum machine learning model by a user via a model generation framework/interface, in accordance with an embodiment herein.
Figure 10C:
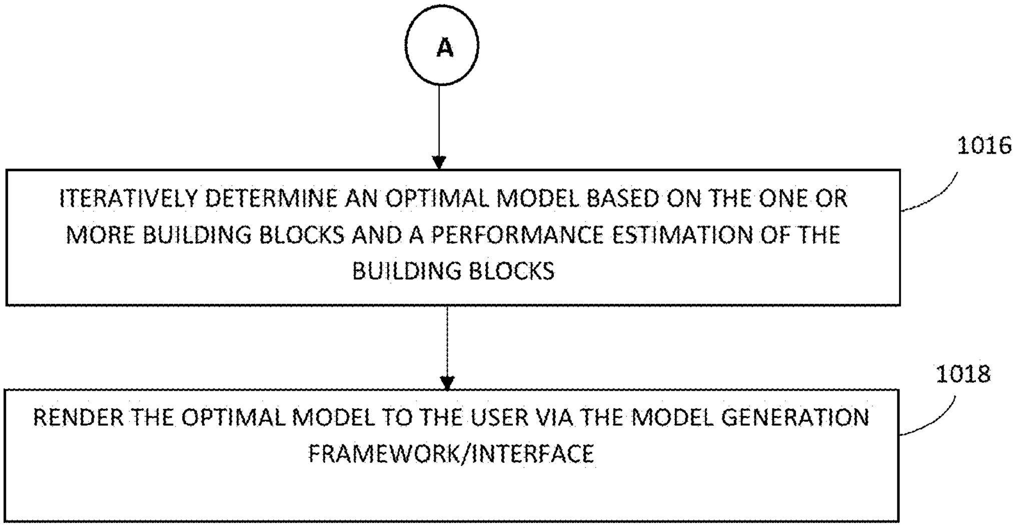

FIGS. 10B-10C illustrates a flow chart explaining a processor-implemented method of generating at least one of an automated machine learning model, an artificial intelligence model or a quantum machine learning model by a user via a model generation framework/interface, according to an embodiment herein. At step 1012, the method includes receiving a user input including at least one of a data, one or more tasks and a metadata, from the user via the model generation framework/interface, the metadata includes at least one of: a selection of domain, a selection of sub-domain, or one or more keyword tags. At step 1014, the method includes determining one or more building blocks in the selection of domain or the selection of sub-domain by performing a neural architecture search. At sub-step 1014A a first search space is generated by querying one or more pre-tagged base models and one or more base models associated with the metadata. At sub-step 1014B, a second search space is deduced for the neural architecture search from the first search space. At sub-step 1014C, a search strategy is built based on a meta knowledge from the first search space and an architecture knowledge from the second search space. At sub-step 1014D, a performance of a model associated with the first search space and the second search space is evaluated based on a historical evaluation result in the first search space and a current evaluation in the second search space. The sub steps 1014C and 1014D are repeated using the performance of the model. At step 1016, the method includes iteratively determining an optimal model based on the one or more building blocks and a performance estimation of the one or more building blocks. The optimal model includes at least one of the automated machine learning model, the artificial intelligence model or the quantum machine learning model. At step 1018, the method includes rendering the optimal model to the user via the model generation framework/interface.

The aforementioned training of machine learning model in a way that the predicted probabilities for binary outcomes are intuitive (i.e. close to the ideal 0 or 1) facilitates in real-time at least one of (1) enabling at least one automated workflow, based on one or more rules conditioned on a distribution of the predicted probabilities obtained from the trained machine learning model; and (2) correctly classifying the plurality of predicted probabilities obtained from the trained machine learning model and presenting the plurality of correctly classified predicted probabilities on a display device without further manual processing. The system as shown is used in an internet application as part of a software as a service offering for making binary outcome predictions which are easily interpretable by average end users. The system as shown is also used by an internet application for automating any needed workflows based on one or more rules conditioned on a distribution of the predicted probabilities for binary outcomes.

Figure 11:
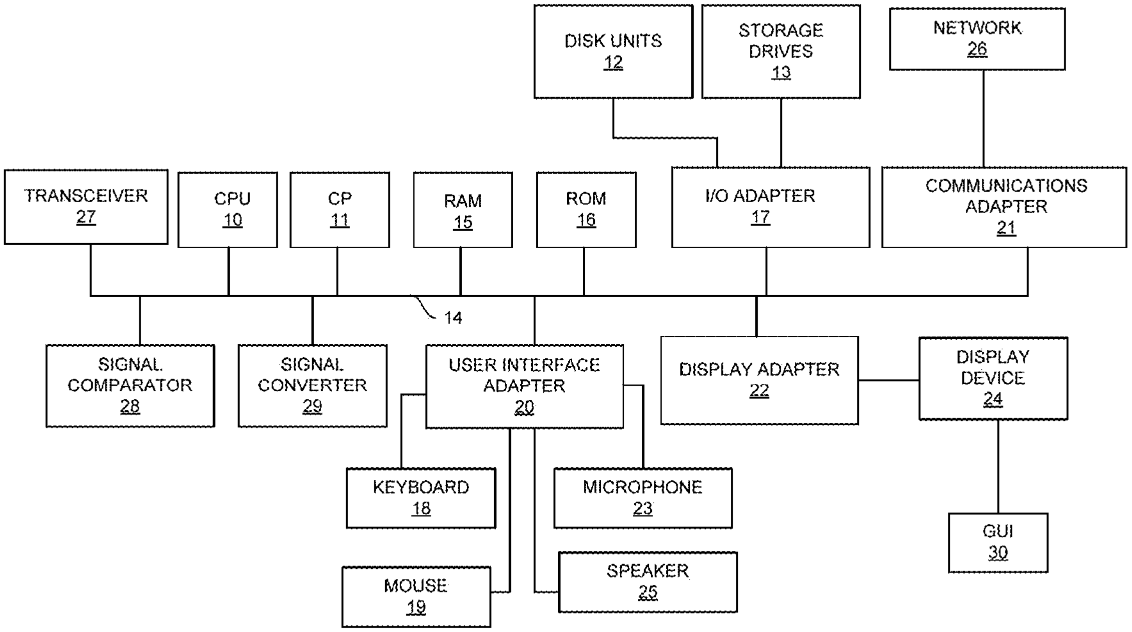
FIG. 11 illustrates a block diagram of a system for a model generation framework for generating at least one of an artificial intelligence model, a machine learning model or a quantum model, according to an embodiment herein.

A representative hardware environment for practicing the embodiments herein is depicted in FIG. 11 with reference to FIGS. 1 through 10. This schematic drawing illustrates a hardware configuration of computer system 104 of FIG. 1, in accordance with the embodiments herein. The hardware configuration includes at least one processing device 10 and a cryptographic processor 11. The computer system 104 may include one or more of a personal computer, a laptop, a tablet device, a smartphone, a mobile communication device, a personal digital assistant, or any other such computing device, in one example embodiment. The computer system 104 includes one or more processor (e.g., the processor 108) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computer system 104 may be implemented with only one CPU.

The I/O adapter 18 is enabled to connect to peripheral devices, such as disk units 11 and tape drives 13, or other program storage devices that are readable by the system. The computer system 104 is configured to read the inventive instructions on the program storage devices and follow these instructions to execute the methodology of the embodiments herein. The computer system 104 is further provided with a user interface adapter 19 that connects a keyboard 15, mouse 17, speaker 24, microphone 22, and/or other user interface devices such as a touch screen device (not shown) to the bus 12 to gather user input. Additionally, a communication adapter 20 is provided to connect the bus 12 to a data processing network 25, and a display adapter 21 is provided to connect the bus 12 to a display device 23 which is embodied as an output device such as a monitor, printer, or transmitter, for example.

The embodiments herein include both hardware and software elements. The embodiments that are implemented in software include but are not limited to, firmware, resident software, microcode, etc. Furthermore, the embodiments herein are provided in the form of a computer program product accessible from a computer-usable or computer-readable medium providing program code for use by or in connection with a computer or any instruction execution system. For the purposes of this description, a computer-usable or computer readable medium is any apparatus that comprises, stores, communicates, propagates, or transports the program for use by or in connection with the instruction execution system, apparatus, or device.

The medium is any one of an electronic, magnetic, optical, electromagnetic, infrared, or semiconductor systems (or apparatus or device) or a propagation mediums. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code includes at least one processor coupled directly or indirectly to memory elements through a system bus. The memory elements include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The various embodiments herein facilitate simplification of a search space of a neural architecture search (NAS) by using only the domain, the sub-domain and keywords related to model tasks as constituents to form the first search space and deduce the second search space from the first search space. Since using domains and sub-domains forms part of the metadata and the keywords, the search space for model discovery process is dramatically reduced and rendering the search to be more effective compared to conventional techniques.

The embodiments herein provide a system with capabilities to create domain and sub-domains, within which there is a facility to discover the AI/ML/Quantum models.

The embodiments herein provide a system to develop a Model generating UI and workspace consisting of a capability to create the domain and sub domain and populate base models to generate optimal AI model The embodiments herein provide a system to develop a UI/workspace consisting of a capability to tag AI/ML/Quantum models according to domain and subdomains The embodiments herein provide a system to develop a UI/workspace consisting of a capability to annotate model using key words, along with domains and sub domains The embodiments herein provide a system to develop a UI/workspace for searching models according to keywords.

The embodiments herein provide a system to develop a system and a method for an automated meta learning process for new model generation based on the domains, sub domains and keywords.

The embodiments herein provide a system to develop a system and a method for an automated transfer learning for new model generation based on domain, sub domain and keywords The embodiments herein provide a system to develop a system and a method for an Automated Network Architecture Search (NAS) based on information from model annotation of domain, subdomain and keywords.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of illustration and not of limitation. Many changes and modifications may be made within the scope of the embodiments herein without departing from the spirit thereof, and the embodiments herein include all such modifications.

Although the embodiments herein are described with various specific embodiments, it will be obvious for a person skilled in the art to practice the embodiments herein with modifications.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A computer implemented method comprising one or more sequences of instructions, stored on a non-transitory computer readable storage medium and executed on a hardware processor in a system for generating at least one of an automated machine learning model, an artificial intelligence (AI) model or a quantum machine learning model from an annotated data, said method comprising the steps of:

storing a plurality of base models in the non-transitory computer readable storage medium, each of the plurality of base models tagged with a set of metadata each comprising at least one of a domain, a sub-domain, or one or more keyword tags;

receiving a user input comprising data, a task indicating to select a model, a selected performance parameter, and input metadata, from said user via a model generation framework/interface, wherein said input metadata comprises at least one of: a selection of domain, a selection of a sub-domain, and one or more keyword tags;

generating a first search space comprising a set of base models based on each of the set of base models having at least one matching tag to a domain tag, a sub-domain tag, or a keyword tag of the input metadata;

generating a second search space comprising a subset of the set of base models based on a neural architecture of each of the subset of base models;

generating a performance estimation for each base model of the subset of base models in the second search space based on the selected performance parameter;

iteratively determining an optimal model from the second search space based on the performance estimation of each of the subset of base models in the second search space, wherein said optimal model comprises at least one of said automated machine learning model, said artificial intelligence model or said quantum machine learning model;

executing the determined optimal model using the data in the user input to generate a result; and rendering the result of the execution of the determined optimal model to said user via said model generation framework/interface.

2. The method of claim 1, comprising:

1) building a search strategy based on a meta knowledge from said first search space and an architecture knowledge from said second search space;

2) evaluating a performance of a model associated with said first search space and said second search space based on a historical evaluation result in said first search space and a current evaluation in said second search space; and 3) repeating the steps 1) to 2) using said performance of said model.

3. The method of claim 1, wherein step of receiving said user input further comprises:

receiving an additional user input comprising at least one of: a) a type of data, b) a data corresponding to said type of data, c) a target device to perform a data cleansing on, and d) a number of devices; and performing a data preprocessing for annotating said user input based on said additional user input for cleansing and encoding said user input into a parsable state.

4. The method of claim 1, further comprises:

receiving a training data from said user on said model generation framework/interface, training said optimal model based on said training data; and providing said trained optimal model to said user via said model generation framework/interface.

5. The method of claim 1, further comprises a step of performing an online prediction using said optimal model, comprising the steps of:

receiving a training data from said user via said model generation framework/interface;

performing said online prediction using said optimal model by applying one or more model parameters associated with said optimal model to said training data; and rendering a prediction result to said user via said model generation framework/interface.

6. The method of claim 1, further comprises monitoring said optimal model comprising the steps of:

receiving an input data from said user in a predetermined format;

monitoring said optimal model based on said input data; and rendering a result of said monitoring to said user via said model generation framework/interface.

7. The method of claim 6, wherein said monitoring comprises at least a concept drift type monitoring or a covariate shift type monitoring.

8. The method of claim 1, wherein said method further comprises generating one or more custom models, comprising steps of:

receiving a unique model name, a data set, and one or more model files from said user on said model generation framework/interface;

receiving a dataset and one or more model files from said user: and generating said one or more custom models by using a path of said one or more model files as function parameters.

9. The method of claim 8, wherein said generating one or more custom models further comprises:

receiving a selection of said one or more custom models and at least a domain or a sub-domain and one or more keywords to tag said one or more custom models, from said user; and tag said one or more custom models with said at least a domain or a sub-domain and one or more keywords.

10. The method of claim 1, further comprises deploying said optimal model upon receiving a deployment selection from said user, wherein said deploying said optimal model comprises a cloud-based deployment or an edge device specific deployment.

11. A system for generating at least one of an automated machine learning model, artificial intelligence model or quantum machine learning model by a user via a model generation framework/interface through a software application or algorithm, said system comprising:

a memory that stores a set of instructions and an information associated with said model generation framework/interface;

a processor that executes said set of instructions for performing the steps of:

storing a plurality of base models in the memory, each of the plurality of base models tagged with a set of metadata each comprising at least one of a domain, a sub-domain, or one or more keyword tags;

receiving a user input comprising data, a task indicating to select a model, a selected performance parameter, and input metadata, from said user via said model generation framework/interface, wherein said metadata comprises at least one of: a selection of domain, a selection of sub-domain, and one or more keyword tags;

generating a first search space comprising a set of base models based on each of the set of base models having at least one matching tag to a domain tag, a sub-domain tag, or a keyword tag of the input metadata;

generating a second search space comprising a subset of the set of base models based on a neural architecture of each of the subset of base models;

generating a performance estimation for each base model of the subset of base models in the second search space based on the selected performance parameter;

c) iteratively determining an optimal model from the second search space based on performance estimation of each of the subset of base models in the second search space, wherein said optimal model comprises at least one of said automated machine learning model, said artificial intelligence model or said quantum machine learning model;

executing the determined optimal model using the data in the user input to generate a result; and rendering the result of the execution of the determined optimal model to said user via said model generation framework/interface.

12. The system of claim 11, comprising 1) building a search strategy based on a meta knowledge from said first search space and an architecture knowledge from said second search space;

2) evaluating a performance of a model associated with said first and second search spaces based on a historical evaluation result in said first search space and a current evaluation in said second search space; and 3) repeating the steps 1) to 2) using said performance of said model.

* * * * *